US006705675B1

(12) United States Patent
Eastman et al.

(10) Patent No.: US 6,705,675 B1
(45) Date of Patent: Mar. 16, 2004

(54) ADJUSTABLE CHILD SEAT FOR TODDLERS TO SMALL CHILDREN

(75) Inventors: Alan W. Eastman, Medina, OH (US); Robert J. Warner, Jr., Akron, OH (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 09/567,098

(22) Filed: May 8, 2000

(51) Int. Cl.[7] .................................................. B60N 2/28
(52) U.S. Cl. .............................. 297/250.1; 297/256.1; 297/256.13; 297/111; 297/284.11; 297/410; 297/411.37; 24/265 BC
(58) Field of Search ............................ 297/250.1, 256.1, 297/256.11, 256.13, 105, 111, 284.11, 410, 483, 484, 411.37; 24/265 BC

(56) References Cited

U.S. PATENT DOCUMENTS

| 270,724 | A | * | 1/1883 | Baldwin |
| 423,698 | A | * | 3/1890 | Plimsoll ............ 297/284.11 X |
| 1,702,955 | A | * | 2/1929 | Zaday ........................ 297/111 |
| 2,638,152 | A | | 5/1953 | Pulsifer |

(List continued on next page.)

FOREIGN PATENT DOCUMENTS

| DE | 41 21 795 A1 | 2/1992 |
| DE | 197 52 536 C1 | 7/1998 |
| DE | 197 55 526 A1 | 2/1999 |
| EP | 0 056 614 A2 | 7/1982 |
| EP | 0 121 899 A2 | 10/1984 |
| EP | 0 302 607 A2 | 2/1989 |
| EP | 0 751 033 A2 | 1/1997 |
| EP | 0 816 163 A1 | 1/1998 |
| FR | 2 748 919 | 11/1997 |
| GB | 1 201 043 | 8/1970 |
| GB | 1 541 885 | 3/1979 |
| GB | 1 581 408 | 12/1980 |
| GB | 2 123 686 | 2/1984 |
| GB | 2 207 043 A | 1/1989 |
| GB | 2 245 161 | 1/1992 |
| GB | 2 266 839 | 11/1993 |
| JP | 8113067 | 5/1996 |
| NL | 1011880 | 10/2000 |
| WO | WO 93/22954 | 11/1993 |

OTHER PUBLICATIONS

Britax booster seat photographs, 6 photographs, 6 sheets, (date unknown).
Recaro booster seat photographs, 11 photographs, 6 sheets, (date unknown).
Recaro Start Instruction Manual, pp. 1–13, (date unknown).
Brochure, Century Products Div. of Graco Children's Products Inc. " NextStep—Toddler/Youth Car Seats" (1998).
Recaro Start Car Seat photos, 3 pages.
Concord Lift Car Seat photos, 3 pages.
Century Products On–Line Catalog, NextStep™ Toddler/Youth Car Seat, Model 4920pvl, http://192.215.32.15/productdata/cent/c4920–pvl.html.

*Primary Examiner*—Rodney B. White
(74) *Attorney, Agent, or Firm*—Foley & Lardner

(57) ABSTRACT

An adjustable child seat includes a seat body having a seat back and a seat portion. The seat portion has a first base and a second base movably mounted to the first base. The child seat further includes a seat adjusting mechanism for adjusting the length of the seat to customize to differently sized children. In addition, the child seat includes a recline mechanism connected to the first and second bases to selectively tilt the seat body. The child seat can also include two adjustable armrests, and adjustable headrest, and an adjustable shoulder belt clip.

28 Claims, 14 Drawing Sheets

U.S. PATENT DOCUMENTS

| | | | | |
|---|---|---|---|---|
| 3,007,738 | A | * 11/1961 | Gardel et al. | |
| 3,265,437 | A | 8/1966 | Mincieli | |
| 3,385,631 | A | * 5/1968 | Gertler | 297/111 |
| 3,547,487 | A | * 12/1970 | Shankman | 297/111 |
| 3,761,126 | A | 9/1973 | Mulholland | 297/384 |
| 3,853,350 | A | 12/1974 | Leffler | |
| 3,926,473 | A | 12/1975 | Hogan | 297/115 |
| 4,334,709 | A | 6/1982 | Akiyama et al. | 297/284.11 |
| 4,402,548 | A | 9/1983 | Mason | |
| 4,643,474 | A | 2/1987 | Wise et al. | 254/250 |
| 4,655,506 | A | 4/1987 | Wise et al. | 297/467 |
| 4,738,488 | A | 4/1988 | Camelio | |
| 4,738,489 | A | 4/1988 | Wise et al. | 297/487 |
| 4,779,930 | A | * 10/1988 | Rosen | 297/391 X |
| D298,388 | S | 11/1988 | Wise et al. | D6/333 |
| 4,790,601 | A | 12/1988 | Burleigh et al. | |
| 4,854,639 | A | 8/1989 | Burleigh et al. | |
| 4,874,203 | A | 10/1989 | Henley | 297/250.1 |
| 4,909,574 | A | 3/1990 | Sedlack | 297/488 |
| 4,915,447 | A | 4/1990 | Shovar | 297/284.11 |
| 5,022,669 | A | 6/1991 | Johnson | 280/30 |
| 5,054,853 | A | 10/1991 | Gillies et al. | |
| 5,082,325 | A | 1/1992 | Sedlack | 297/250 |
| D324,611 | S | 3/1992 | Sedlack | D6/333 |
| 5,098,157 | A | 3/1992 | Surot | 297/250.1 |
| 5,106,158 | A | 4/1992 | Dukatz et al. | |
| 5,125,717 | A | 6/1992 | Sköld et al. | 297/250 |
| 5,161,522 | A | 11/1992 | Clevenger | |
| 5,181,761 | A | 1/1993 | Meeker | 297/250 |
| 5,286,090 | A | 2/1994 | Templin et al. | 297/473 |
| 5,294,182 | A | 3/1994 | Colasanti | 297/467 |
| 5,335,964 | A | 8/1994 | Sedlack et al. | 297/256.13 |
| 5,380,063 | A | 1/1995 | Dauphin | 297/284.11 |
| 5,388,888 | A | 2/1995 | Franzmann et al. | 297/284.11 |
| D355,986 | S | 3/1995 | Myers | D6/356 |
| 5,427,432 | A | 6/1995 | Meeker et al. | 297/256.15 |
| 5,466,043 | A | 11/1995 | Lambert et al. | |
| D365,691 | S | 1/1996 | Sedlack | D6/333 |
| 5,486,037 | A | 1/1996 | Harper | 297/397 |
| 5,580,126 | A | 12/1996 | Sedlack | 297/256.15 |
| 5,586,810 | A | 12/1996 | Liu | |
| 5,609,393 | A | 3/1997 | Meeker et al. | 297/256.13 |
| 5,645,317 | A | * 7/1997 | Onishi et al. | 297/250.1 |
| 5,653,504 | A | 8/1997 | Henson | |
| 5,662,382 | A | 9/1997 | Kerr et al. | |
| 5,664,833 | A | 9/1997 | Celestina-Krevh et al. | 297/256.15 |
| 5,733,004 | A | 3/1998 | Celestina-Krevh et al. | 297/250.1 |
| 5,735,576 | A | * 4/1998 | Pepys et al. | 297/397 |
| 5,746,478 | A | 5/1998 | Lumley et al. | 297/256.13 |
| 5,810,445 | A | 9/1998 | Surot | 297/411.37 |
| 5,829,829 | A | * 11/1998 | Clestina-krevh | 297/284.9 X |
| 5,836,650 | A | 11/1998 | Warner, Jr. et al. | 297/256.11 |
| 5,845,968 | A | 12/1998 | Lovie | 297/250.1 X |
| 5,860,695 | A | 1/1999 | Espenshade et al. | 297/250.1 X |
| 5,951,103 | A | * 9/1999 | Barnhill | 297/248 |
| 6,030,047 | A | 2/2000 | Kain | |
| 6,033,019 | A | 3/2000 | Hession-Kunz et al. | 297/250.1 |
| 6,045,183 | A | * 4/2000 | Weber | 297/250.1 |
| 6,045,184 | A | * 4/2000 | Nakagawa | 297/250.1 |
| 6,106,063 | A | 8/2000 | Dauphin | 297/284.11 |
| 6,109,693 | A | 8/2000 | Bauer et al. | 297/284.11 |
| 6,135,553 | A | 10/2000 | Lovie et al. | |
| 6,139,100 | A | * 10/2000 | Baskin-Lockman et al. | 297/284.11 |
| 6,155,638 | A | 12/2000 | Bapst | 297/250.1 |
| 6,209,840 | B1 | 4/2001 | Chen | |
| 6,227,616 | B1 | 5/2001 | Branke et al. | 297/256.1 |
| 6,237,994 | B1 | 5/2001 | Bentley et al. | 297/284.11 X |
| 6,273,509 | B1 | 8/2001 | Reithmeier et al. | |
| 6,299,253 | B1 | 10/2001 | Chen | |

OTHER PUBLICATIONS

Century Products On–Line Catalog, NextStep™ Toddler/Youth Car Seat, Model 4920fbg, http://192.215.32.15/productdata/cent/c4920–fbg.html.

Century Products On–Line Catalog, NextStep™ Toddler/Youth Car Seat, Model 4920nso, http://192.215.32.15/productdata/cent/c4920–nso.html.

Century Products On–Line Catalog, NextStep™ SE Toddler/Youth Car Seat, Model 4905jtw, http://192.215.32.15/productdata/cent/c4905–jtw.html.

WPI Abstract accession No. 1996–272280 and JP 8113067—May 7, 1996.

* cited by examiner

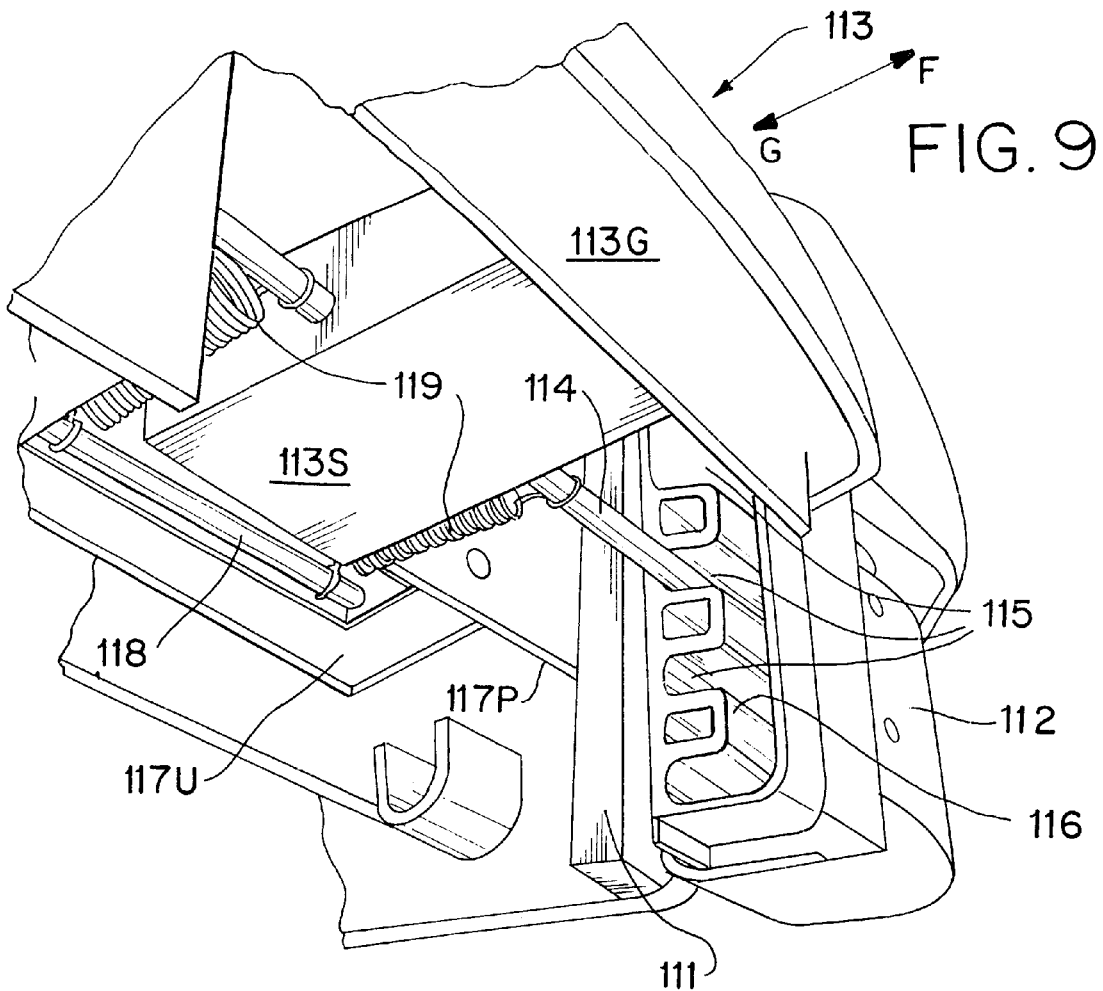
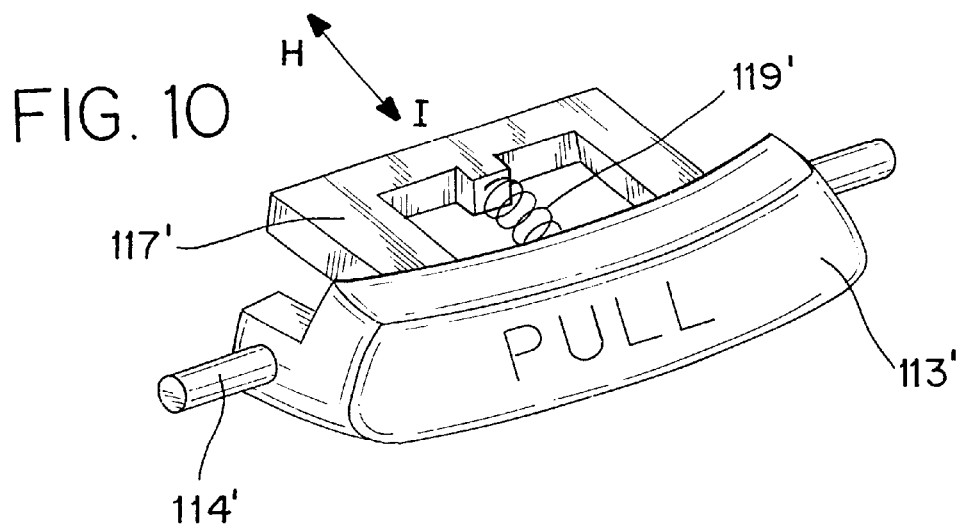

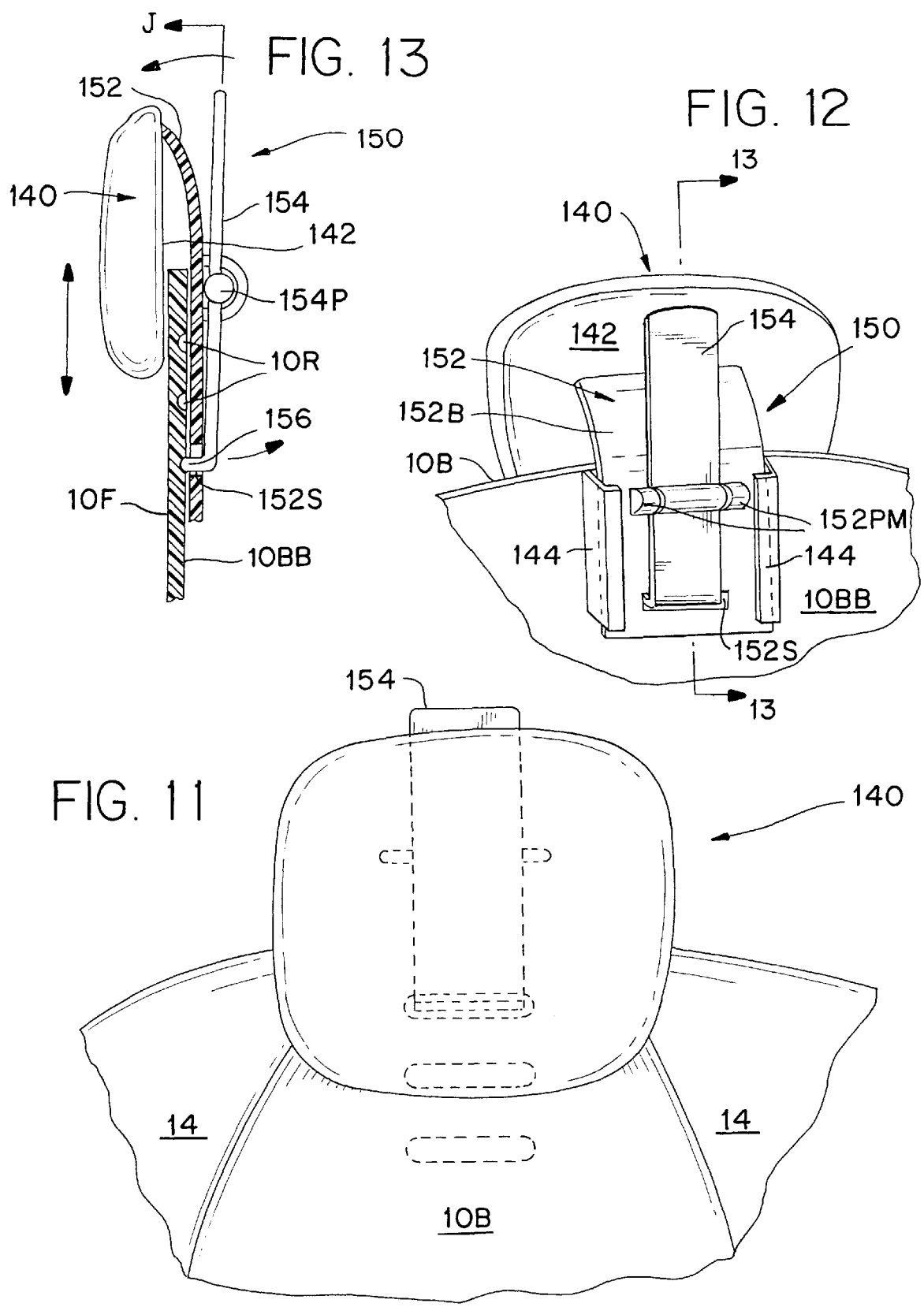

ADJUSTABLE CHILD SEAT FOR TODDLERS TO SMALL CHILDREN

BACKGROUND

Child car seats, also known as child restraint seats, are provided in many sizes and configurations. Generally, conventional car seats are "grown out of" in relatively short periods, and thus need to be replaced at various milestones in the physical development of the child. As the child grows, he or she graduates to a car seat configured to accommodate the child's increased height and weight. Although the growth rate of children varies widely, even with the slowest growing children, replacement of the car seat becomes necessary before the end of the car seat life expectancy.

While the child is an infant, the parent must place the child in a rearwardly facing infant car seat for vehicular travel. The infant car seat needs to be designed to support an infant, who is not able to support him or her self, thereby allowing the infant, who cannot sit up on its own, to lie or recline in the seat. Once the child is able to sit upright, the infant seat must be replaced by a toddler-sized seat. The toddler-sized seat provides a forward-facing and slightly reclined seating environment for the toddler. The toddler seat is secured to the rear seat of the vehicle and typically includes a harness to secure the toddler within the seat. Eventually, however, the child outgrows the toddler-sized seat and progresses to a youth-sized seat. The youth-sized seat can accommodate children over 40 lbs. and functions primarily as a booster seat.

Child car seats must be replaced relatively frequently to accommodate the relatively fast growth rate of children—increasing height, weight, and needs of the child. Additionally, parents and other adults often must care for several children who do not fit within the same seat model. In this instance, the parents must buy two or more seats to accommodate their various-sized children.

One child car seat that has attempted to accommodate growing children is disclosed in co-pending application Serial No. 09/167,893, the disclosure of which incorporated by reference herein. The disclosed child car seat is suited for accommodating both toddlers (e.g., 20–40 lbs.) and older children (e.g., 40–80 lbs.) who are not yet large enough to use vehicle seatbelts. A parent of a toddler can thus adjust the car seat as the child grows, rather than buy a new car seat of a bigger size. To achieve this versatility, the child car seat of Serial No. 09/167,893 includes armrests that may be vertically adjusted between a first, upper position and a second, lower position. In a typical toddler configuration, the armrests are placed in the upper position, and, in a configuration suitable for a larger child, the armrests can be adjusted to the lower position. In addition, a platform to recline the car seat of Serial No. 09/167,893 is arranged below the base by a pivoting connection. The base is pivotal between first and second positions relative to the platform. The child car seat also includes a harness removably mounted to the seat body through grommets located in the base and the seat back. As the child grows, the harness can be relocated to different grommet pairs. For example, for a larger child, the harness can be positioned in grommets located more forwardly on the base and higher on the seat back. As the child surpasses 40 lbs., the harness is omitted completely, and the lap/shoulder belt of the vehicle can be used to secure the child to the car seat. The child car seat can also include a head support removably mounted to the seat back. Once the child has grown past the toddler stage, the head support cushion can be removed from the seat back.

The features of the child car seat described in Serial No. 09/167,893, including the adjustable armrests, the adjustable harness, and the removable head support cushion, all increase the versatility of this child car seat as compared to non-adjustable child car seats. Nonetheless, there is a need for an improved versatile car seat that can accommodate various child sizes. The present invention addresses this need

SUMMARY OF THE INVENTION

One aspect of the present invention is thus drawn to an adjustable vehicle seat that can accommodate different children. A child seat according to the present invention provides a more versatile seat that can be quickly and readily adapted to accommodate toddlers and children sized large enough to use adult lap/shoulder belts, for example, from toddlers of 20 lbs. to youths of 80 lbs. In addition to eliminating costs associated with replacing outgrown car seats, the versatility features of this child seat are independent, meaning that it can be customized to maximize comfort and support of a child.

A child seat according to the present invention comprises a seat body including a seat back and a seat portion connected to the seat back. The seat portion has a first base connected to the seat back and a second base connected to the first base. The first and second bases form a seating surface upon which a child can sit. The first and second bases are movably connected relative to each other to change the area of the seating surface. In a preferred embodiment, the first base is fixedly connected to the seat back, and the second base is movably mounted to the first base for movement between a retracted position and an extended position.

The child seat according to the present invention further includes a seat adjusting mechanism that moves the second base toward and away from the first base to lengthen and shorten the seating surface. The seat adjusting mechanism preferably comprises an anchor fixedly mounted to the first base, a shaft axially and movably mounted to the anchor and anchored at one end to the second base, and an actuator extending from the anchored end. The shaft is movable relative to the anchor upon actuation of the actuator to move the second base relative to the first base.

The child seat preferably includes first and second armrests mounted to opposite sides of the second base. The armrests are axially movable with the second base. Further, the armrests are asymmetrically mounted to the second base about an axis. Each armrest can be rotatable between a first position and a second position, and an arm resting portion of each armrest is higher in the first position than in the second position. To lock the armrests in the first or second positions, the child seat preferably has actuators associated with each armrest. In addition, each armrest has a guide rail, and the actuator engages the respective guide rail to control rotation of the respective armrest. In one embodiment, the guide rail has a curved pathway, and the actuator has a key configured to slide relative to the curved pathway during rotation of the respective armrest. A beverage container holder can be detachably mounted to either of the armrests.

In another aspect of the invention, the child seat can include a recline mechanism. The recline mechanism is connected to the first and second bases for selectively tilting the seat body relative to a vehicle seat. The recline mechanism can tilt the seat body regardless of the relative position between the first and second bases. The recline mechanism preferably comprises a recline assembly connected to the second base, and one or more telescoping arms connected to the recline assembly and pivotally connected to the first base. The recline assembly, in turn, preferably comprises a pair of opposing towers mounted to the first base, a recline rod releasably mounted to the towers, and a recline handle connected to the recline rod. The towers each can have vertically spaced slots adapted to receive the recline rod, with the recline handle being movable to adjust the position of the recline rod relative to the towers.

In yet another aspect of the invention, the child seat includes a headrest adjustably mounted to the seat back. The seat back has a front surface, and the headrest has a back surface. The headrest is adjustable between at least a first position and a second position. In the first position, at least a portion of the back surface of the headrest overlaps the front surface of the seat back, and, in the second position, the back surface of the headrest either clears or fully overlaps the front surface of the seat back. To move the headrest, the child seat preferably includes a headrest adjustment mechanism. This mechanism comprises a support member mounted to the headrest and having an opening that exposes a backside of the seat back. The mechanism also comprises a bracket attached to the backside of the seat back, and the bracket movably guides the support member. The mechanism further comprises an adjustment latch movably mounted to the support member and having a projection aligned with the opening to engage the backside of the seat back. The backside of the seat back can have a plurality of recesses adapted to hook the projection of the adjustment latch to lock the headrest relative to the seat back.

In still another aspect of the invention, the child seat includes a shoulder clip. The shoulder clip preferably comprises a mounting member, adapted to be secured to the child seat, and a belt receiving portion rotatably mounted to the mounting member. The belt receiving portion has a first belt-receiving opening and a second belt-receiving opening. The first belt-receiving opening has a first width, and the second belt-receiving opening has a second width greater than the first width.

These features, as well as other features, of the present invention will be set forth in the description that follows.

BRIEF DESCRIPTION OF THE DRAWINGS

These and other features, aspects, and advantages of the present invention will become more apparent from the following description, appended claims, and accompanying exemplary embodiment(s) shown in the drawings, which are briefly described below.

FIG. 9 is a bottom perspective view of a left-hand side of the seat portion of FIG. 8.

FIG. 10 is a schematic of an alternative handle assembly for the seat recline mechanism.

FIG. 11 is a front elevation view of an adjustable headrest according to another aspect of the invention.

FIG. 12 is a back elevation view of the headrest and headrest adjustment mechanism.

FIG. 13 is side view, in cross section, of the headrest and the headrest adjustment mechanism taken along line 13—13 in FIG. 12.

DETAILED DESCRIPTION

Although references are made below to directions in describing the drawings, they are made relative to the drawings (as normally viewed) for convenience. The directions, such as left, right, upper, lower, etc., are not intended to be taken literally or limit the present invention in any form.

Figure 2:
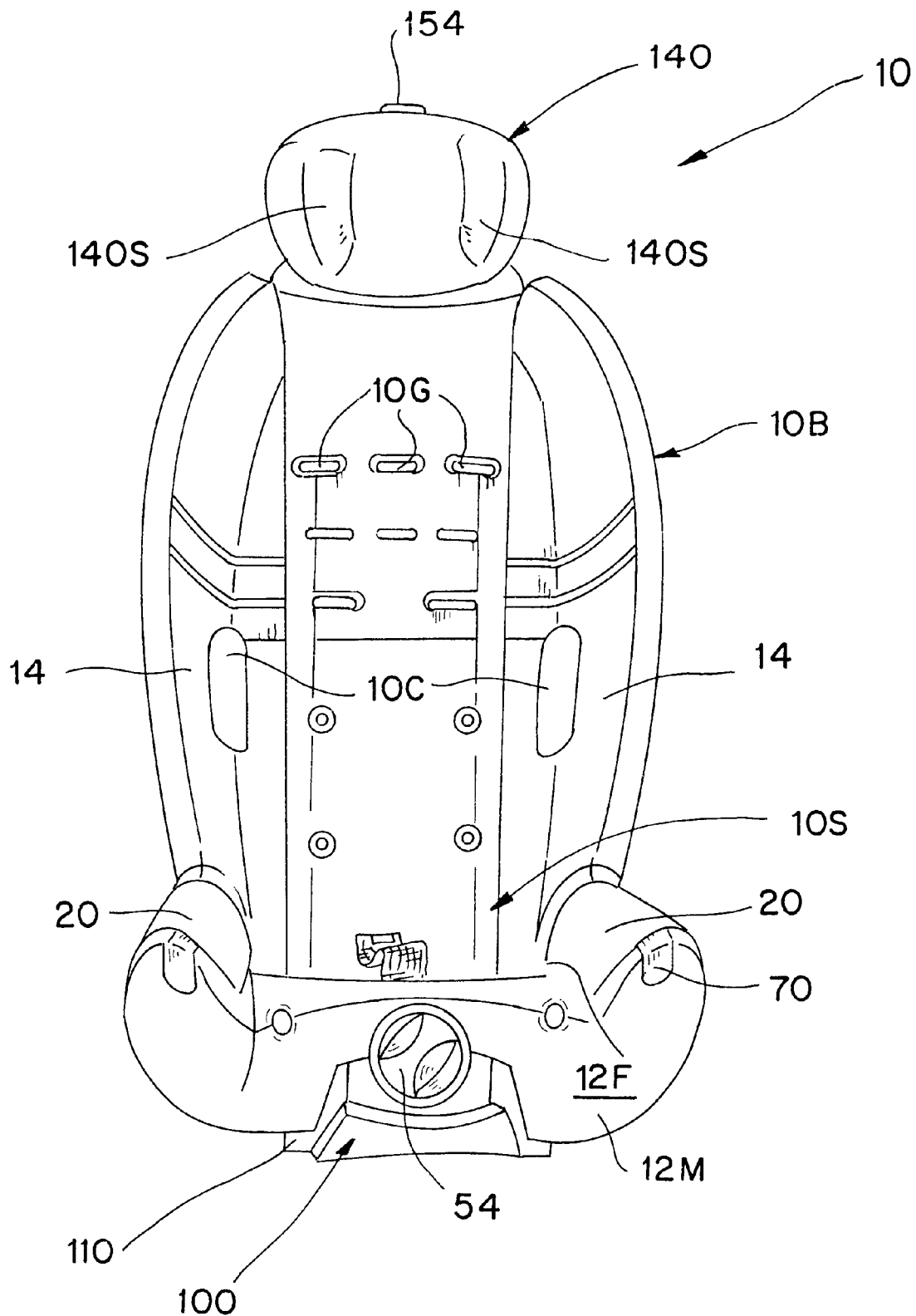
FIG. 2 is a front elevation view of the seat body.
Figure 3:
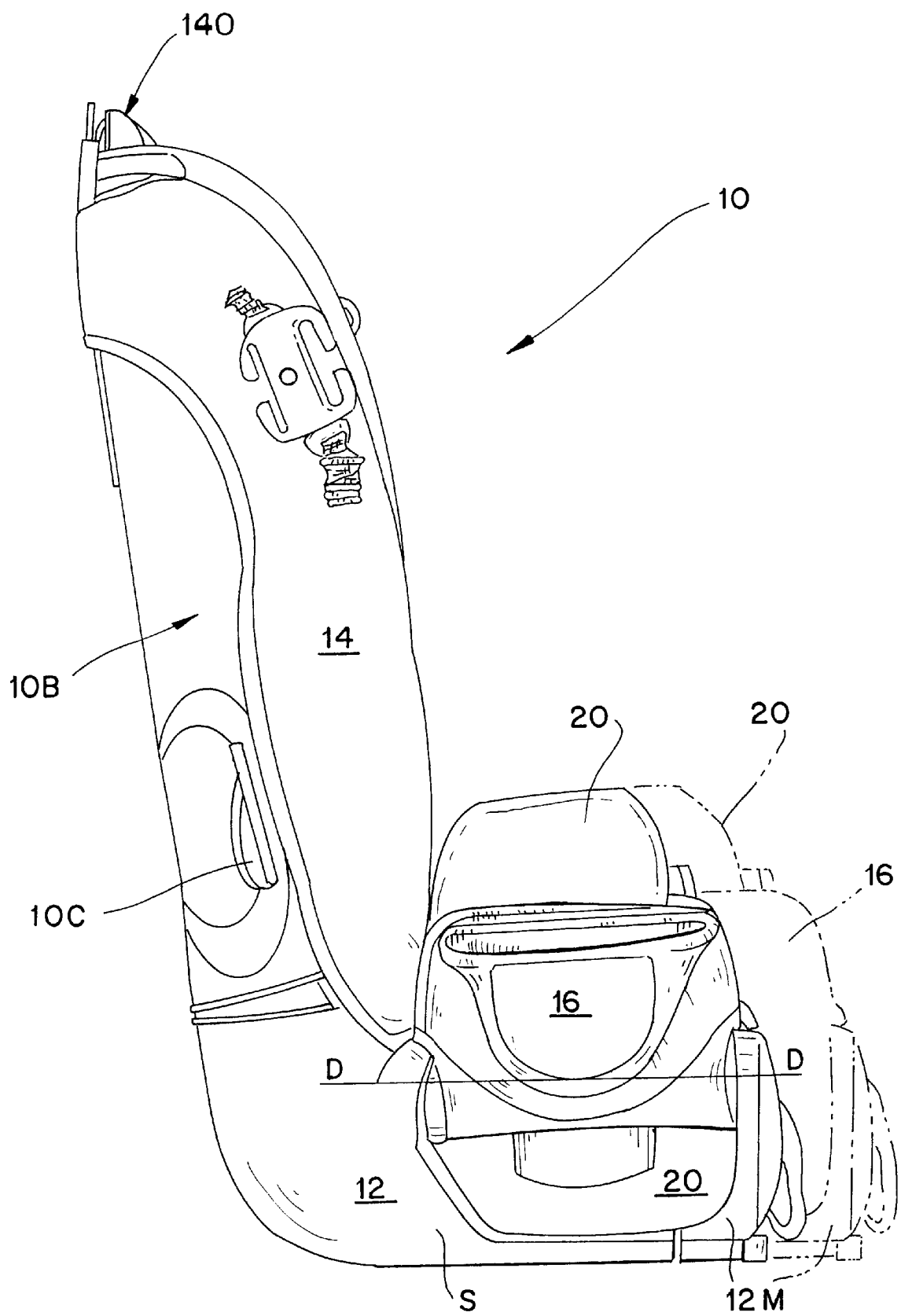
FIG. 3 is a side elevation view of the seat body in a retracted position.
Figure 3A:
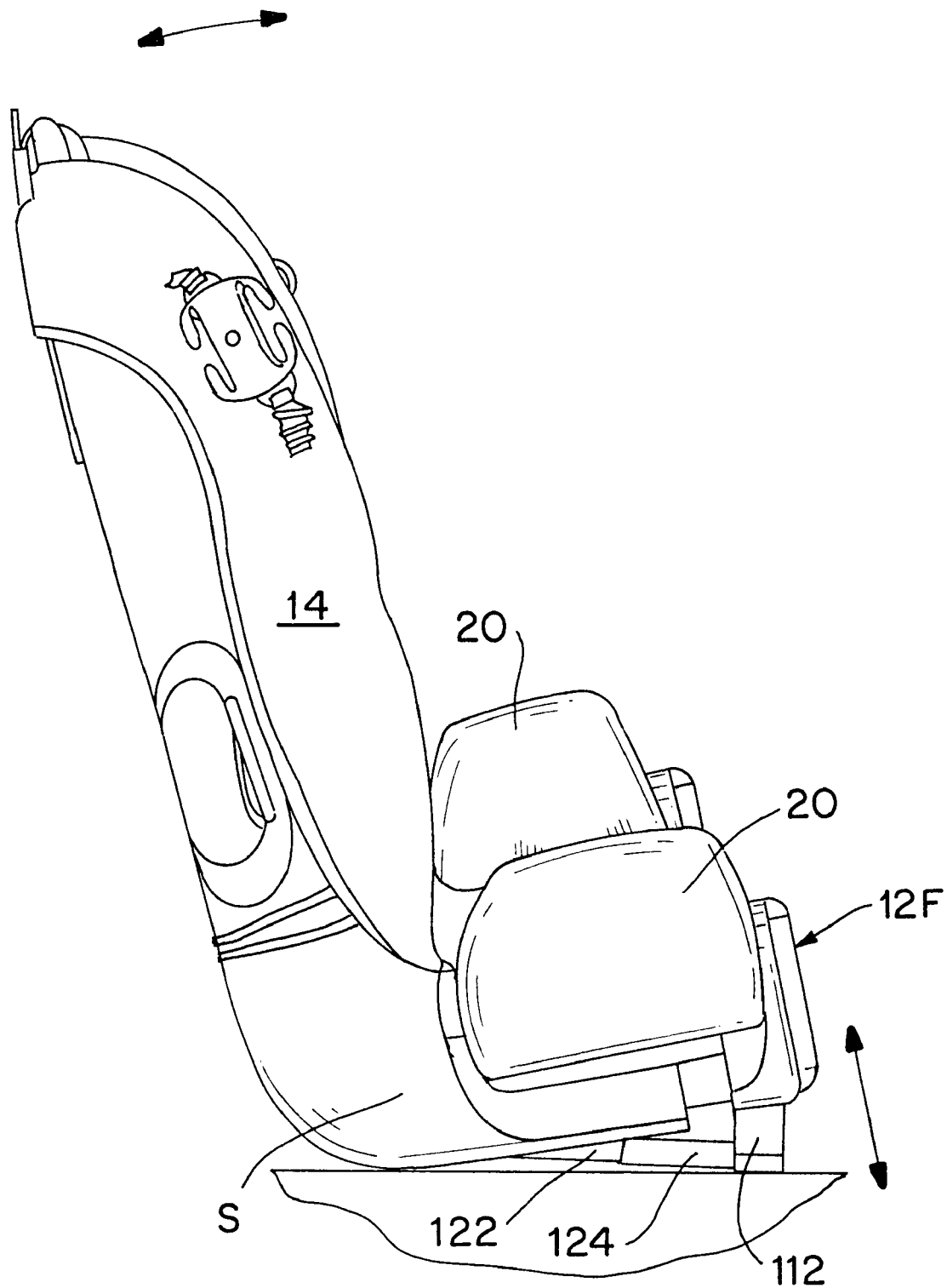
FIG. 3A is a side elevation view of the seat body in a reclined position.
Figure 3B:
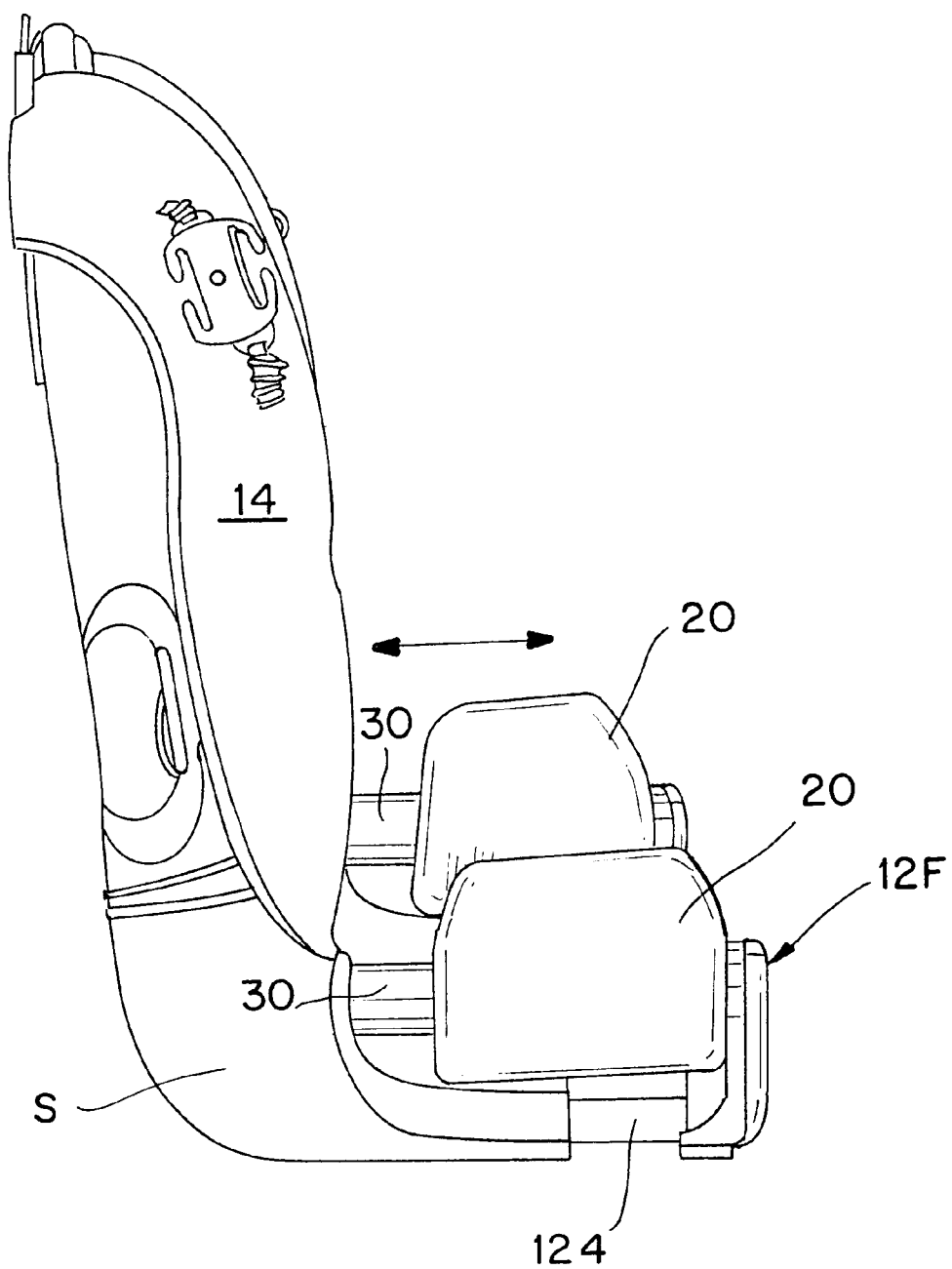
FIG. 3B is a side elevation view of the seat body in an extended position.
Figure 4:
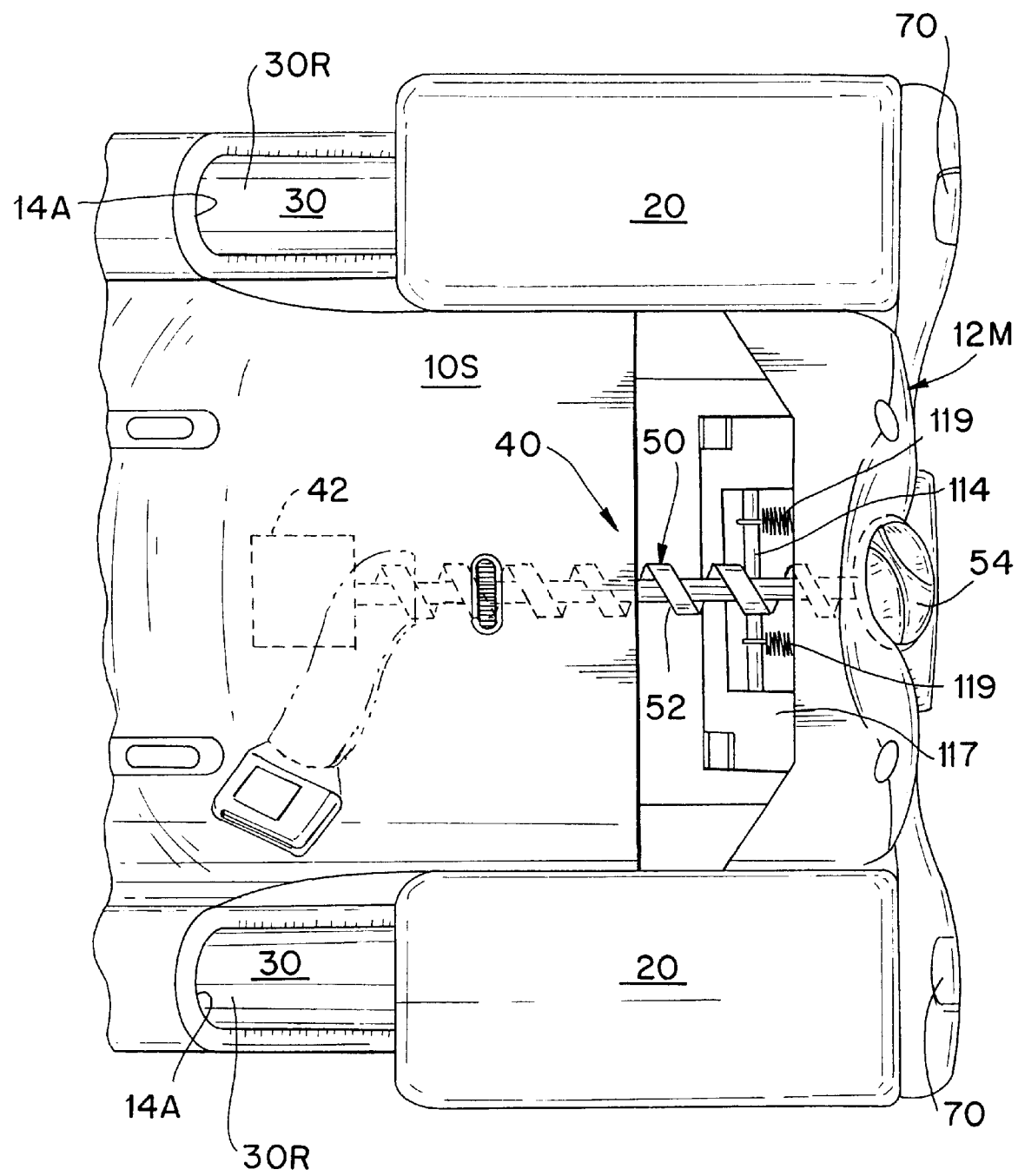
FIG. 4 is a top plan view of the seat portion of the seat body in the extended position.

The child seat 10 disclosed herein can be quickly and easily adjusted by a parent to accommodate children of different sizes, for example, children within the range of about 20–80 lbs. One aspect of the child seat 10 is that its seat portion 10S can be adjusted between a retracted position (FIG. 3 in solid line) and an extended position (see FIG. 3 in dashed lines; FIGS. 3B, 4) for accommodating a bigger child. Another feature of the child seat 10 is that its armrests 20 can be adjusted between an up position (20a in FIG. 1) and a down position (20b in FIG. 1; FIG. 2). In particular, by positioning the armrests 20 in the upper position, comfort for a smaller child can be increased, while providing a more secure restraint. In addition, an older child can more easily climb into the child seat 10 when the armrests 20 are in the lower position. The child seat 10 can also include a beverage container holder 16 that is removably mounted to either armrest 20 when the armrest 20 is in the lower position (20b in FIG. 1). Further, the child seat 10 can include a recline mechanism 100 (see FIG. 7) that selectively tilts the seat body from an upright position (see FIG. 3, 3B), more suited to larger children, to one or more reclined positions (see FIG. 3A), more suited to toddlers. In addition, the car seat 10 can include an adjustable headrest 140, moveable between a first (low) position (see FIG. 1) and a second (high) position (see FIG. 2) and, in a preferred embodiment, positions therebetween. The headrest 140 can be movably mounted to the seat back 10B, between the seat's side supports 14. As a child grows, the headrest 140 can be moved to accommodate the increasing height of the child. Further, the child seat 10 can have a shoulder belt clip 160 (see FIG. 14) that is configured to allow either tight cinching of the vehicle shoulder belt against the child or loose fitting of the shoulder belt with respect to the child. Each of these features, individually and in combination with the other features, facilitates relatively simple seat adjustment for customizing the seat to suit different children, as will be better understood from the following description.

Figure 1:
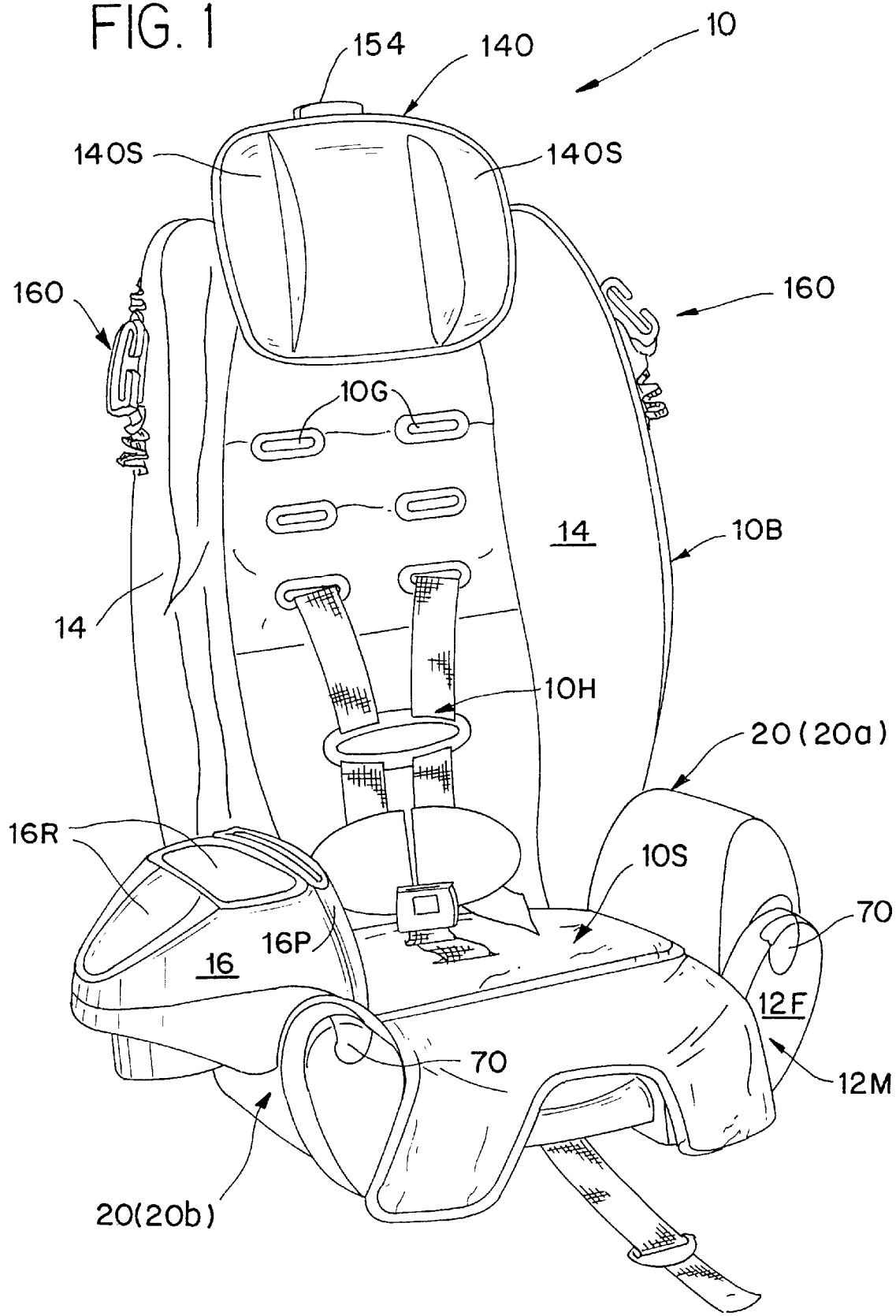
FIG. 1 is a perspective view of an adjustable child seat in accordance with the invention.

Referring now to the drawings, wherein identical numerals indicate like parts, FIG. 1 shows a commercial embodiment of a child seat 10 that embodies the present invention. The child seat 10 is intended to be used as a forwardly facing seat. This child seat 10 can be used in any environment and in any vehicle in which a child needs to be secured to, or restrained in, a seat. In its typical fields of use, the child seat 10 provides a protective restraint system for motor vehicles and aircraft. Referring to FIGS. 1–3, which illustrate the major components, the seat 10 includes a seat portion 10S with left- and right-hand side armrests 20 and a seat back 10B. The seat portion 10S can comprise a fixed base 12 (FIG. 3) and a movable base 12M, which is movable relative to the fixed base 12 to change the area of the seat's seating surface. The seat back 10B can include left and right side supports 14 and an adjustable headrest 140. The armrests 20 extend between the side supports 14 and the movable base 12M, and are movable with the movable base 12M. The armrests 20 are adjustable between an up position (20a) and a down position (20b).

FIG. 1 shows the seat in a configuration suited to toddlers, i.e., children between 20–40 lbs. Here, the seat portion 10S is in a retracted position, one of the armrests 20 is in the upper position, beverage container holder 16 creates an opposite "upright armrest," and the headrest 140 is in a lower position. Where the toddler is too low to reach the headrest 140, a separate headrest cushion can be directly attached to the seat back 10B at an appropriate vertical height via grommets 10G. In addition, although the seat 10 is not reclined in FIG. 1, a reclined position may be preferable for a toddler.

FIG. 2 shows the seat configuration more suited to children over 40 lbs. and up to 80 lbs. or more. Here, the seat portion 12 is extended to an extended position, the armrests 20 are in the lower position, and the headrest 140 is in a higher position. Further, the seat is upright, not reclined.

A harness 10H, such as the one disclosed in co-pending U.S. patent application Ser. No. 09/167,893, or any conventional harness, can be attached to the seat back 10B and the base 12. A detachable fabric padding can cover portions of the outside of the child seat 10 and can be attached in any suitable manner, such as Velcro™, mounting posts, mounting plugs, adhesives, or mechanical fasteners, such as hooks, buttons, or straps. The padding makes the seat 10 comfortable for sitting. Additional child seat accessories can also be used with the present invention. For example, an infant headrest cushion (not shown) can be attached to the seat back 10B at different vertical positions via grommets 10G. Once the child is tall enough to rest its head against the adjustable headrest 140, the infant headrest cushion can be removed from the child car seat 10. Positioning and structure of a suitable headrest cushion for use with the child seat is described in co-pending U.S. patent application Ser. No. 09/167,893.

The adjustable features of the car seat 10 will now be explained.

Adjustable Seat Portion

As mentioned above, the seat portion 12 of the child seat 10 can be adjusted between a first position (see FIG. 1; FIG. 3 in solid line) and a second position (see FIG. 3 in dashed lines; FIGS. 3B, 4). In the retracted position, the movable base 12M is located adjacent to the fixed base 12, and in the second, extended position, the movable base 12M is spaced from the fixed base 12. The movable base 12M is movably mounted to the fixed base 12 so that the movable base 12M can slide forward and lengthen the seating area. The seat length adjustment can be made with a seat adjusting mechanism 40 that connects the fixed base 12 and the movable base 12M.

Figure 5:
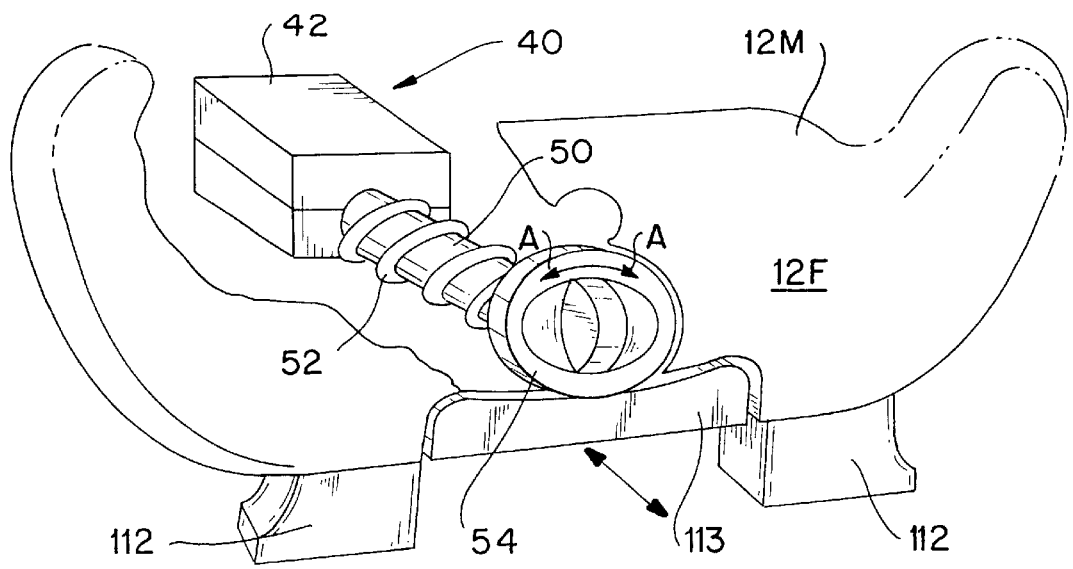
FIG. 5 is a schematic, perspective view of a seat adjusting mechanism according to another aspect of the invention.
Figure 5A:
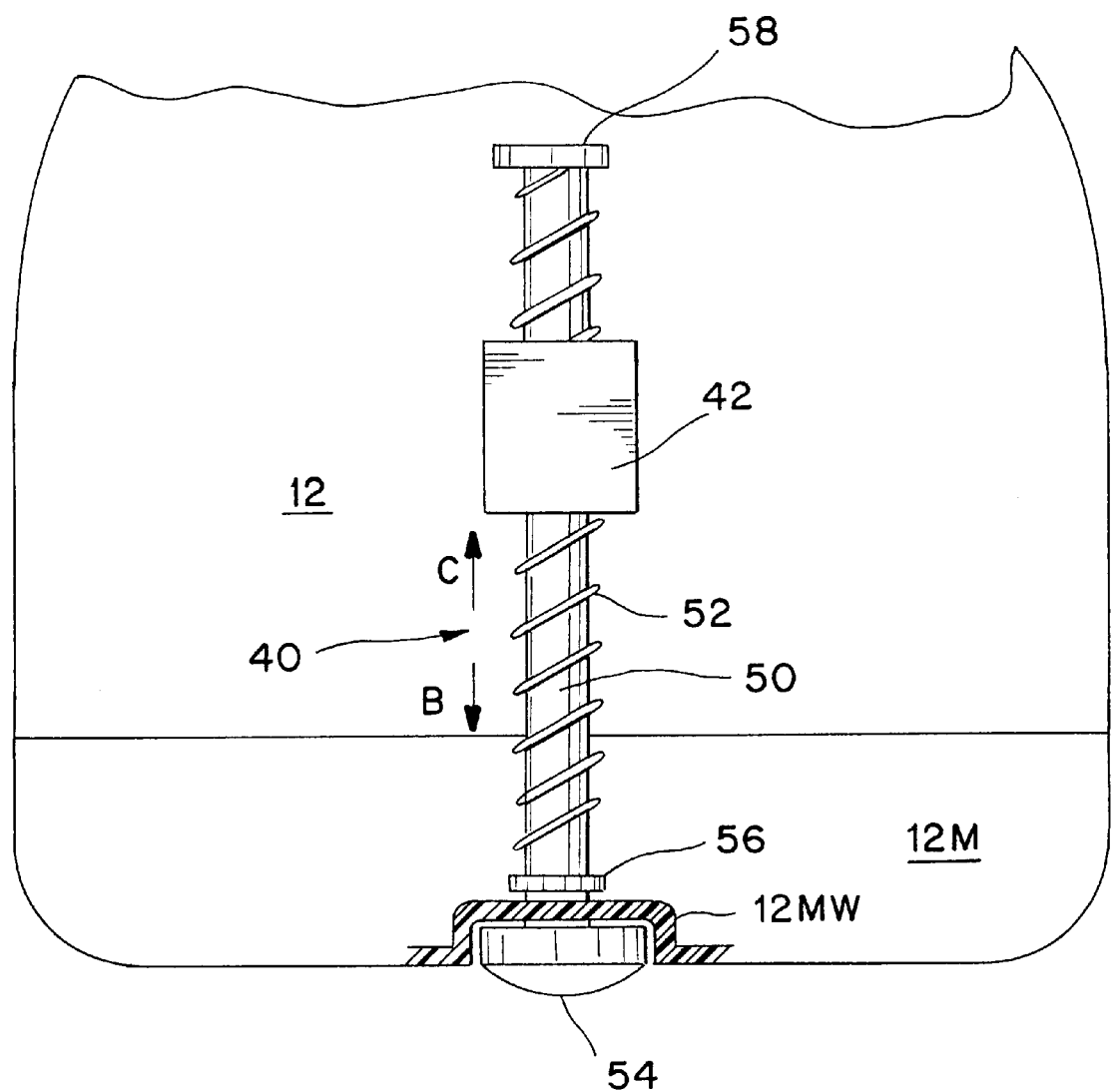
FIG. 5A is a schematic, top plan view of the seat adjusting mechanism.

The seat adjusting mechanism 40 is shown in detail in FIGS. 4–5A. The seat adjusting mechanism 40 generally includes an anchor block 42 and a threaded rod or shaft 50. The anchor block 42 is fixedly connected to the base 12. The anchor block 42 has a through hole with internal threads (not shown), and the shaft 50 has complementary external threads 52. The shaft 50 threads through the complementary threads formed in the anchor block 42, and is attached to the movable base 12M. Specifically, the proximal end of the shaft 50 extends through the movable base 12M.

Referring to FIG. 5A, the shaft 50 has an actuator 54 at its proximal (front) end, a first stop 56, and a second stop 58. A wall member 12MW of the base 12M is sandwiched between the first stop 56 and the actuator 54 to prevent the shaft 50 from moving axially relative to the wall member 12WM, while permitting it to rotate. The actuator 54 can be knob that is manually rotatable in the direction of arrows A—A. Rotating the actuator 54 rotates the threaded shaft 50. Since the anchor block 42 is fixedly mounted to the fixed base 12, the anchor block 42 remains stationary, but as the shaft 50 rotates, its external threads 52 ride along the internal threads of the anchor block 42, moving the shaft 50 in its axial direction (arrows B and C) relative to the anchor block 42, depending on the direction of rotation. When the shaft 50 moves in the direction of arrow B, since the proximal end thereof is axially fixed to the wall member 12MW, the movable base 12M is forced away from the fixed base 12, i.e., the movable base 12M moves to the extended position. When the shaft 50 moves in the direction of arrow C, the movable base 12M moves back toward the base 12, i.e., the movable base 12M moves to the retracted position. The second stop 58 is located at the rod's distal (rear) end. The second stop 58 limits movement of the threaded shaft 50 in the direction of arrow B so that the shaft 50 cannot be rotated out of the anchor block 42. Preferably, the shaft external threads 52 will be widely spaced so that course adjustment will not require a great amount of turning. In this respect, acme threading configuration can be used.

The seat adjusting mechanism 40 thus can retract or extend the movable base 12M to change the seat surface area of the seat portion 10S. In a preferred embodiment, the movable base 12M is adapted to extend approximately up to 4 inches from the base 12. As a practical matter, the repositioning of the movable base 12M will be necessary only in small increments during the physical development of the child.

Further, the surface upon which the child sits will be cushioned by overlapping pads or cushions (not shown). In a preferred embodiment, the child seat has a first flap of padding that is connected to the fixed base 12 and a second flap of padding that attaches to the movable base 12M. The first and second flaps of padding overlap. As the movable base 12M is extended away from the fixed base 12, the second flap of padding, attached to the movable base 12M, slides relative to the first flap of padding. The second flap of padding has a sufficient surface area such that, even when the movable base 12M is extended away from the fixed base 12, there is still some overlap of the first and second flaps of padding. Accordingly, a child will be seated on a fully cushioned seating area in both the retracted and extended positions, as well as all positions in between.

The armrests 20 are connected to the movable base 12M of the seat portion 12 so that the armrests 20 move fore and aft with the movable base 12M. For example, the movable base 12M can include a structural member or members that engage each armrest 20 so that the armrests 20 track the movement of the movable base 12M. As seen in FIG. 4, the armrests 20 each are respectively mounted to a slidable armrest post 30. Each post 30 is fixedly mounted to the armrest 20, and extends rearwardly from the armrest 20. The rearwardly extending portion 30R is inserted through a post-receiving aperture 14A in the respective lower end of the side support 14. Referring to FIGS. 4 and 5A, as the movable base 12M moves in the direction of arrow B in FIG. 5A, the posts 30 slide forward through the post-receiving apertures. As the movable base 12M moves in the direction of arrow C, the posts 30 slide back through the post-receiving apertures 14A and into the child seat body, where they are ultimately hidden from view within the car seat shell.

In an alternative arrangement, the posts 30 can be fixedly mounted to the respective side supports 14 and slidably mounted to the armrests 20, such that, when the movable base 12M is retracted, the posts 30 are hidden within the interior space of the armrests 20, and, when the movable base 12M is extended, the armrests slide along the posts 30 to the extended position. Further, the posts 30 can be replaced with telescoping arms that allow movement of the armrests 20 with the movable base 12M.

Adjustable Armrests

In addition to being adapted to slide forward and back relative to the seat back 10B, the armrests 20 are mounted to rotate between a first, up position (20a in FIG. 1) and a second, down position (20b in FIG. 1; FIG. 2). FIG. 1 illustrates the left-hand side armrest 20 in the up position 20a to provide additional support for a toddler (e.g., 20 to 40 lbs.). By comparison, FIG. 2 shows the armrests 20 in the down position 20b appropriate for a child past the toddler stage (e.g., 40–80 lbs.).

The arms rests 20 can be rotatably mounted to the movable base 12M. Height adjustment of the armrests 20 is accomplished by rotating the armrests 20 about an axis (D—D in FIG. 3) that is coaxial with the posts 30. Each armrest 20 is asymmetrically or cammed shaped about the axis of rotation D—D so that the surfaces on which the child can rest its forearms lie substantially parallel to the axis of rotation D—D. At different rotational positions, the upper surface of the armrests 20 is at a different height relative to the base 12. The axis of rotation D—D is substantially parallel to the base 12 and substantially perpendicular to the seat back 10B.

Each armrest 20 can be contoured to blend into the exterior side surfaces S of the child seat so that it does extend over the outside contour of the child seat 10. Advantageously, a smooth transition from the side surfaces S of the child seat 10 to the exterior side surfaces of the armrests 20 can occur both in the up and down armrest positions. Accordingly, in either position, the armrests 20 will not encroach on the passenger areas located to the sides of the installed child car seat 10 and will not occupy the vehicle bench or bucket seat area.

Figure 6:
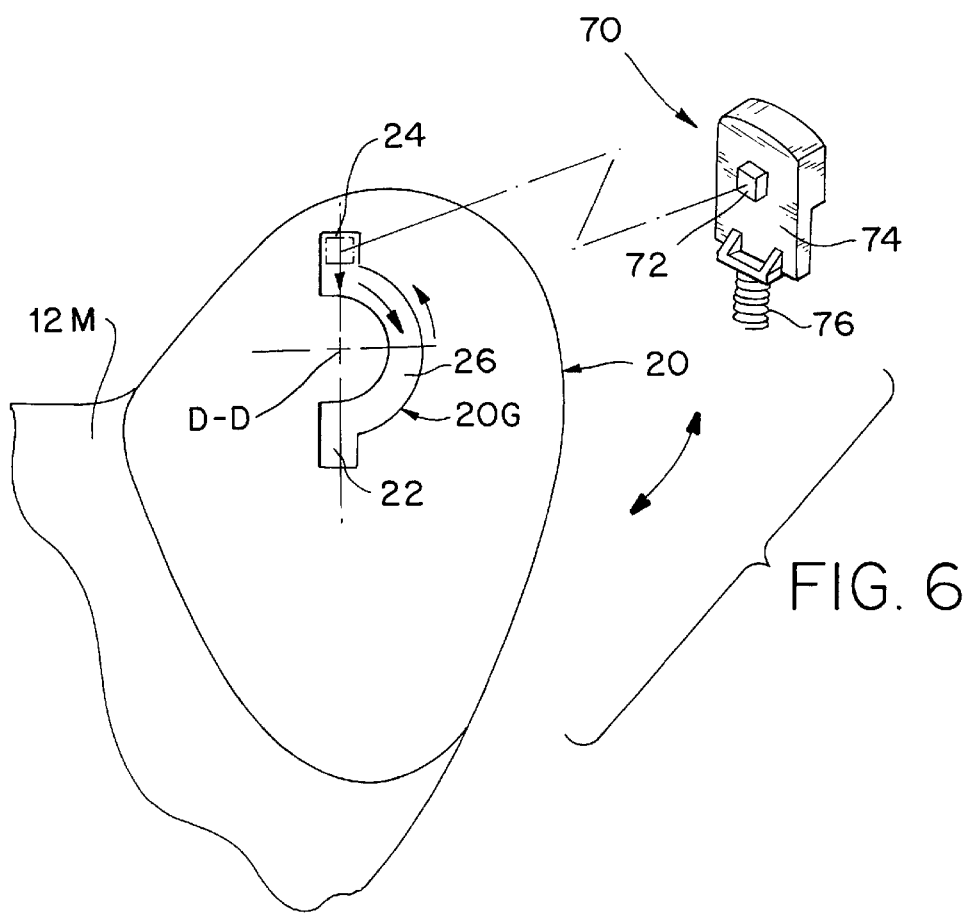
FIG. 6 is an exploded view of an armrest and release actuator for the armrest in accordance with another aspect of the invention.

The rotation mechanism 60 for the armrests 20 will now be described. Referring to FIG. 6, each armrest 20 is rotatably mounted to the left and right sides of the movable base 12M. Each armrest 20 has a guide rail 20G, e.g., a channel, extending axially thereinto. The front wall 12F of the movable base 12M has a pair of openings substantially aligned with the armrest rotational axes, through which a pair of actuator buttons 70 are respectively mounted. A portion of each actuator button 70 can protrude through the respective openings in the front wall 12F so that the buttons 70 can be manually actuated to engage the guide rail 20G and control the respective armrest rotation. The guide rail 20G has a first locking area 22, a second locking area 24, and a curved pathway 26 therebetween. The actuator button 70 has a key 72 on a rear surface 74 thereof that extend axially rearwardly. The key 72 can slide along the curved pathway 26 between the first and second locking areas 22, 24. A biasing element, such as a spring 76, biases the actuator button 70 into engagement with the first locking area 22 when the armrest 20 is in the first, up position 20a and into engagement with the second locking area 24 (as shown in phantom) when the armrest 20 is in the second, down position 20b. The actuator button 70 can be mounted from the inner side of the front wall 12F, which can have guides or guide channels or the like to enable the actuator button 70 to be movable only in the vertical direction, the spring 76 biasing the button 70 upwardly.

Referring to FIG. 6, to rotate one of the armrests 20 from the second position 20b to the first position 20a, the actuator button 70 is slid down so that the key 72 comes out of the second locking area 24 and moves into the adjacent first end of the curved pathway 26. The armrest 20 is rotated, for example, counterclockwise for the left-hand side armrest 20 and clockwise for the right-hand side armrest 20. As the armrest 20 is rotating, the key 72 guides the guide rail 20G. During this time, the curved pathway 26 confines the key 72 to its lowered (unlock) position. When the key 72 reaches the second opposite end of the curved pathway 26, the actuator button 70 is automatically locked into the first locking area 22. To rotate the armrest 20 from the first position 20a to the second position 20b, the steps are reversed. FIG. 6 shows the left-hand side armrest 20a. The guide rail 20G of right-hand side armrest 20 will be the mirror image of the guide rail 20G of the right-hand side armrest 20.

In an alternative embodiment, the armrest adjustment mechanism 60 can be designed according to the adjustable armrests described in co-pending U.S. patent application Ser. No. 09/167,893, the disclosure of which is incorporated herein by reference.

The armrests 20 can be formed of a thermoplastic or thermosetting plastic composite molded into a thin outer shell. A detachable fabric cover with or without padding can be slipped over each armrest and be attached in any suitable manner, including Velcro™, mounting posts, mounting plugs, adhesives, or mechanical fasteners such as hooks, buttons, or straps.

In addition to padding, a beverage container holder 16 can be mounted to either armrest 20 in the second, down position 20b, as seen in FIG. 1. The holder 16 can be attached by Velcro™, although other suitable attachment means can be used. The beverage container holder 16 can include padding on an inner wall thereof to imitate the padding on the opposite armrest. This padding can be in the form of a detachable fabric storage pocket 16P in which child-related items, such as tissues, can be stored. The beverage container holder 16 preferably includes at least two receptacles 16R that are sized to hold relatively soft and flexible drink cups, juice boxes, and the like. Toys and other child-related items, such as facial tissues, can also be stored in the receptacles.

Adjustable Recline Mechanism

Figure 7:
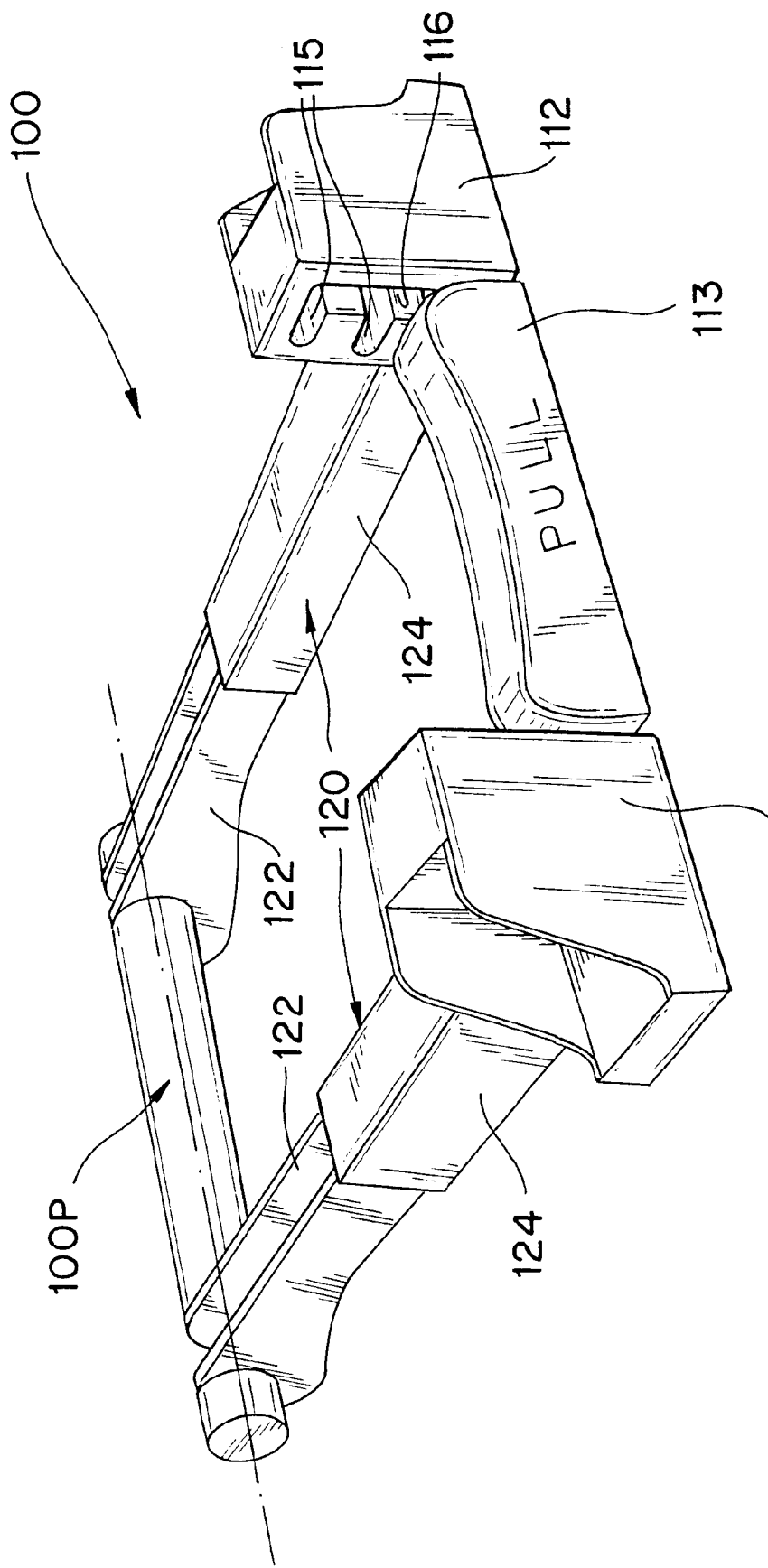
FIG. 7 is a schematic, perspective view of a seat recline mechanism according to another aspect of the invention.
Figure 8:
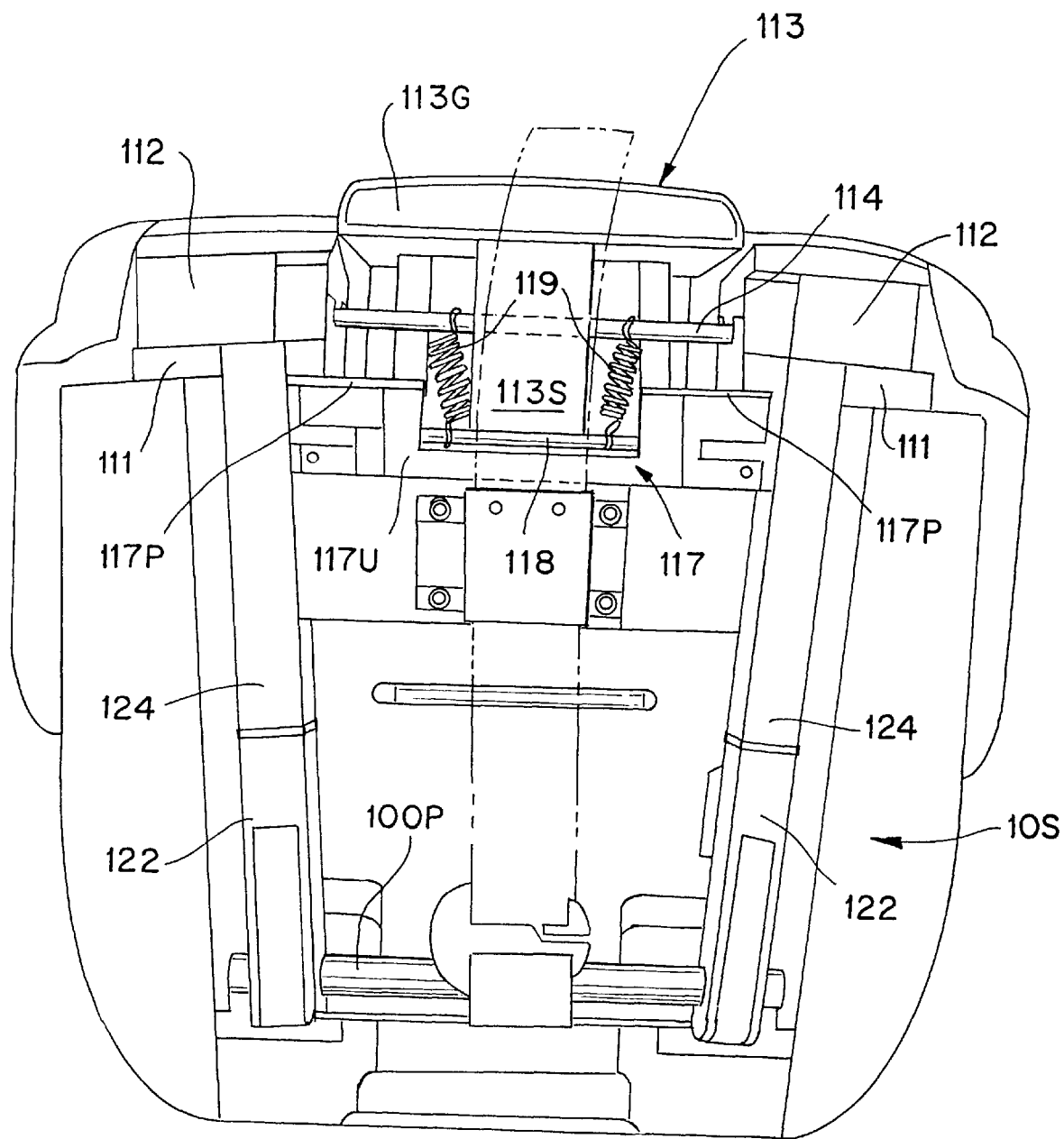
FIG. 8 is a bottom plan view of the seat portion of the seat body.

With reference primarily to FIGS. 7–9, the child car seat 10 can also recline. Rather than reclining the seat back 10B relative to the seat portion 10S, the entire seat body, i.e., both the seat back 10B and the seat portion 10S, can recline relative to a recline mechanism 100 connected to the seat portion 10S. In particular, the recline mechanism 100 can selectively tilt the seat body between a recline position, as shown in FIG. 3A, and an upright position, as shown in FIG. 3. The recline mechanism 100 can tilt the seat body at all positions of the movable base 12M.

The recline mechanism 100 is connected to the seat portion 12 of the seat body to tilt the seat body relative to a substantially horizontally extending reference plane or the vehicle seat. The recline mechanism 100 includes a pivot 100P, a recline assembly 110, and a pair of telescoping rails 120 that connect the recline assembly 110 to the pivot 100P. The pivot 100P can be a shaft or rod connected to the base 12 from its underside, as shown in FIG. 8. The recline assembly 110 is adapted to move with the movable base 12M. The telescoping rails 120 each include a first rail member or arm 122, which is connected to the pivot 100P, and a second rail member or arm 124, which is connected to the recline assembly 110. The first and second arms 122, 124 can be configured to telescope, preferably having the first arm 122 telescope into the second arm 124; however, a reverse telescoping arrangement also can be used.

The pivot member 100P can comprise a single pivot rod or shaft that extends through rear end portions or distal ends of the first arm 122 and into the shell or wall of the car seat body at either side of the base 12. It will be understood that other pivot members and pivotal connections to the telescoping rails are contemplated by the present invention. For example, the pivot member 100P can be formed by discontinuous segments, including a first segment from one side of the car seat shell to the first arm 122 of the first telescoping rail 120, a second segment between the first arms 122 of both retracting rails 120, and a third segment from the first arm 122 of the second telescoping rail 120 to the opposite side of the car seat shell, all three segment operating in tandem to pivot the car seat body relative to a substantially horizontally extending reference plane.

The recline assembly 110 generally includes a pair of opposing feet or towers 112 to which the respective second arms 124 are connected, a shaft or rod 114 (FIG. 8) adjustably positioned in the towers 112, and a handle 113 connected to the rod 112 for moving the rod 112 relative to the towers 112. The towers 112 each have vertically spaced slots 115, which are substantially horizontal, opening into a common, substantially vertical channel 116, similar to the towers disclosed in copending U.S. patent application Ser. No. 09/421,411, the disclosure of which is incorporated herein by reference. The slots 115 of one tower 112 are the mirror image of the slots 115 of the other tower 112 to form pairs of opposing slots for receiving the rod 114. The handle 113 is adapted to vertically position the rod 114 in one of the pairs of slots 115. The embodiment shown in the figures has three slot positions, but the present invention contemplates two or more slot positions. The lowermost slot position can correspond to a full down position, where the seat portion 10S lies in the substantially horizontally extending reference plane. The middle slot position can correspond to a first recline position, where, for example, the seat portion 10S can be tilted at an angle of approximately 7.5° relative to the reference plane. Finally, the uppermost slot position can corresponds to a second, recline position, where, for example, the seat portion 10S can be tilted at an angle of approximately 15° relative to the reference plane. Of course, additional slots can be provided in towers 112 to provide additional recline positions, as would be apparent to one of skill in the art given the present description.

The handle 113 has a gripping portion 113G and a stem 113S extending rearwardly from the gripping portion 113G. The rod 114 extends through the stem 113S. The towers 112 can be connected together with a bracket assembly 117 extending between the opposing towers 112 and behind the handle 113. The bracket assembly 117 can include a U-shaped bracket 117U, the legs of which can connect to a pair of plate-like brackets 117P extending laterally and affixed respectively to the towers 112. A shaft 118 can be mounted to and extend between the legs of the U-shaped bracket 117. As shown in FIG. 9, biasing elements, such as compression springs 119, can span between the rod 114 and the shaft 118 on either side of the handle stem 113S. The springs 119 bias the handle toward the retracted position, where the rod 114 engages one of the pairs of slots 115.

To adjust the tilt of the car seat body, the handle gripping portion 113G is pulled forward (arrow F in FIG. 9) to disengage the rod 114 from a pair of slots 115 in the towers 112. The handle 113 is then shifted up or down along the common channels 116 until the rod 114 is positioned in front of the desired slots 115. The springs 119, upon release of the handle 113, retracts the handle 113 rearwardly (in the direction of arrow G in FIG. 9) and locks the rod 114 to the desired slot position.

FIG. 10 schematically shows an alternative handle arrangement. In this arrangement, the rod 114 extends through the sides of the handle 113.' The spring 119' connects the handle 113' to the U-shaped bracket 117' and biases the handle 113' rearwardly (in the direction of arrow H). To disengage the rod 114 from the towers 112, the handle 113' is pulled forward (in the direction of arrow I), whereupon the rod 114 can be repositioned in the same manner as discussed above in connection with handle 113.

As mentioned above, the recline feature of the present invention can be operative under all conditions, between when the movable base 12M is in either the retracted position (FIG. 1) or the extended position (FIG. 4). The recline assembly 110, including the towers 112, the rod 114, the handle 113, and the bracket assembly 117, moves with the movable base 12M. In this connection, the movable base 12M includes a pair of push plates 111, as shown in FIG. 8, that extend downwardly from the underside of the movable base 12M and abuts against the rear wall of the respective towers 112. As the movable base 12M is extended away from the fixed base 12 by the seat adjusting mechanism 40, the push plates 111 press against the back surface of the towers 112 to move them forward along with the movable base 12M. As this forward movement is occurring, the second arms 124 of the telescoping rails 120 telescope outwardly from the first arms 122. The recline assembly 110 thus follows the movement of the movable base 12M. When the movable base 12M is moved back to the retracted position, the movable base 12M presses against the front surfaces of the towers 112 to move the recline assembly 110 back toward the fixed base 12, retracting the telescoping members 120.

Adjustable Headrest

Figure 13A:
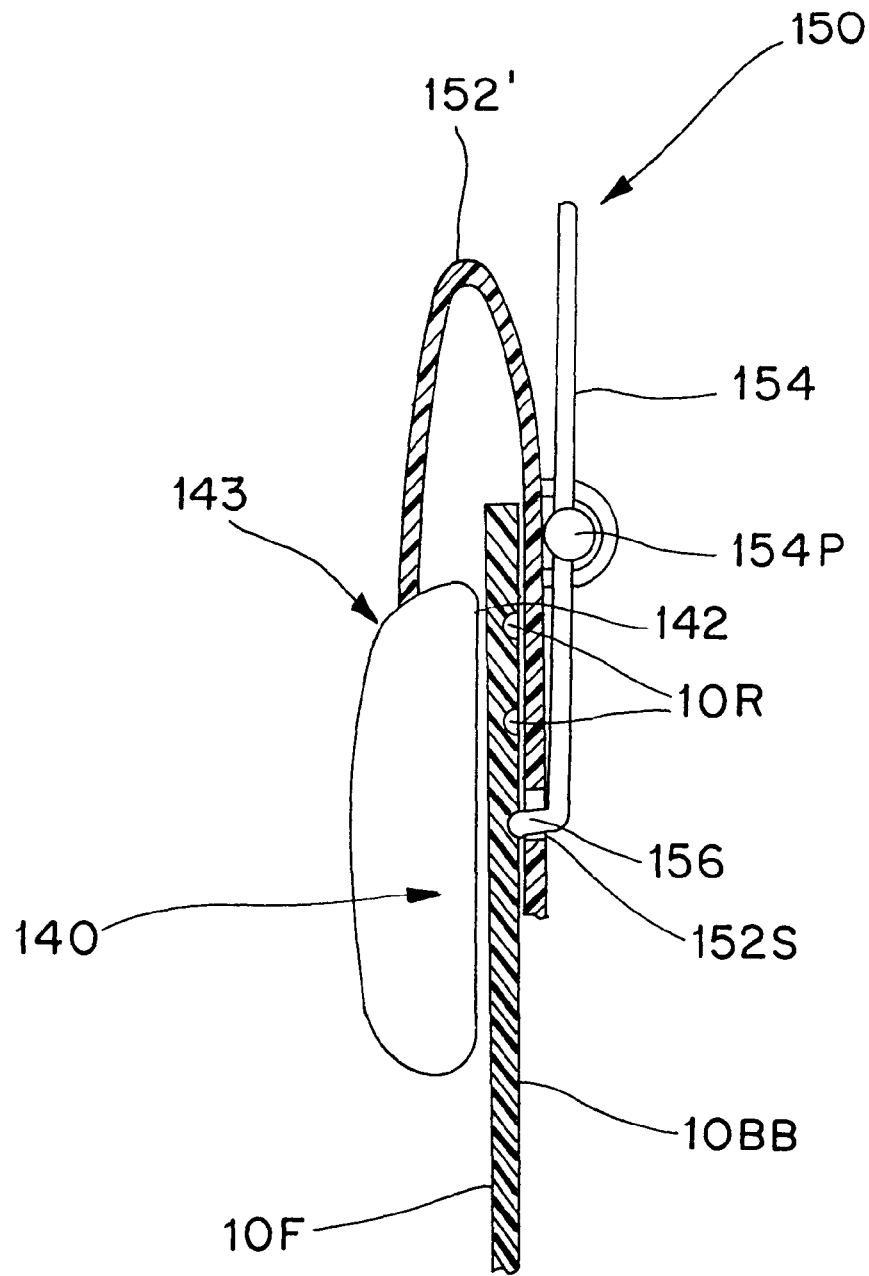
FIG. 13A is side view, in cross section, of the headrest and an alternative headrest adjustment mechanism.

In addition to the adjustable seat portion 12, adjustable armrests 20, and recline feature of the child seat, the child seat 10 also can include an adjustable headrest 140. The headrest 140 can include head support cushions 140S to provide lateral support to the child's head. FIGS. 11–13 show an embodiment of the adjustable headrest 140 according to the present invention. The headrest 140 is adjustably mounted to the seat back 10B so that it can move between two or more vertical positions along the seat back 10B, where, in at least one position, a backside 142 of the headrest 140 overlaps a front side 10F of the seat back 10B. In other vertical positions, the headrest 140 may be adjusted so that the sides 142 and 10F do not overlap at all or, alternatively, completely overlap.

The seat back 10B preferably includes two or more vertically spaced recesses 10R and a pair of spaced brackets 144 mounted on a back surface 10BB thereof. The recesses 10R cooperate with a height adjustment mechanism 150 to adjust the headrest 140 between at least two vertical positions, as will now be described with reference to FIGS. 12 and 13.

The height adjustment mechanism 150 generally includes a support member 152 and an adjustment latch 154 pivotally mounted to the support member 152. The brackets 144 guide and slidably support the support member 152 substantially in the vertical direction. The support member 152 is attached to the headrest 140 and includes an opening or slot 152S therethrough. The adjustment latch 154 is pivotally mounted to the support member 152 via a pivot 154P, such as a pin or shaft with a spring bias. The pivot 154P is secured to the back surface 152B of the support member 152 by a pivot mount brackets 152PM. In addition, a spring or the like (not shown) can bias the adjustment latch 154 into engagement with a desired recess 10R to position the adjustment latch 154 in place relative to the seat back 10B. The adjustment latch 154 includes a projection 156 that is insertable through the slot 152S in the support member 152 and ultimately into one of the recesses 10R in the seat back 10B. To lock the headrest 20 in place at a desired vertical position, the projection 156 engages the recess 10R associated with that vertical position. As the projection 156 is biased inwardly into support member 152, it keeps the projection 156 engaged in the recess 10R.

The projection 156 is preferably located at a lower end of the adjustment latch 154, and the adjustment latch 144 pivots at about its midpoint. To adjust the position of the headrest 140, a parent may grip the end of the adjustment latch 154 opposite to the projection 156 and pull it forward (in the direction of arrow J). The pulling force rotates the adjustment latch 154 about the pivot 154P, which disengages the projection 156 from the particular recess 10R in which it rests. The parent then can pull up/push down the headrest 140 or the adjustment latch 154, which is slidably guided in the bracket 144 in the direction of arrow L—L. This slides the support member 152 up/down between the brackets 144. When the desired position is reached, the parent can release the latch 154. The projection 156 engages the recess 10R, since the projection 156 is biased inwardly toward the recess 10R, or if it is not precisely positioned opposite the recess 10R, the parent can slightly adjust the latch 154 up or down so that the projection 156 can engage the next recess above or below the misaligned position of the projection 156.

In the embodiment shown in FIGS. 11–13, the support member 152 connects to the backside 142 of the headrest 140. In an embodiment where the headrest 140 is positionable to completely overlap the seat back 10B, a support member 152' can be connected to its topside 143, rather than to its backside 142.

The headrest 140 preferably has a width smaller than the distance between the side supports 14 of the child seat 10. It will be understood, however, that the headrest 140 can be configured to extend to the side supports 14.

Installation of Car Seat and Shoulder Belt Clip

Figure 14:
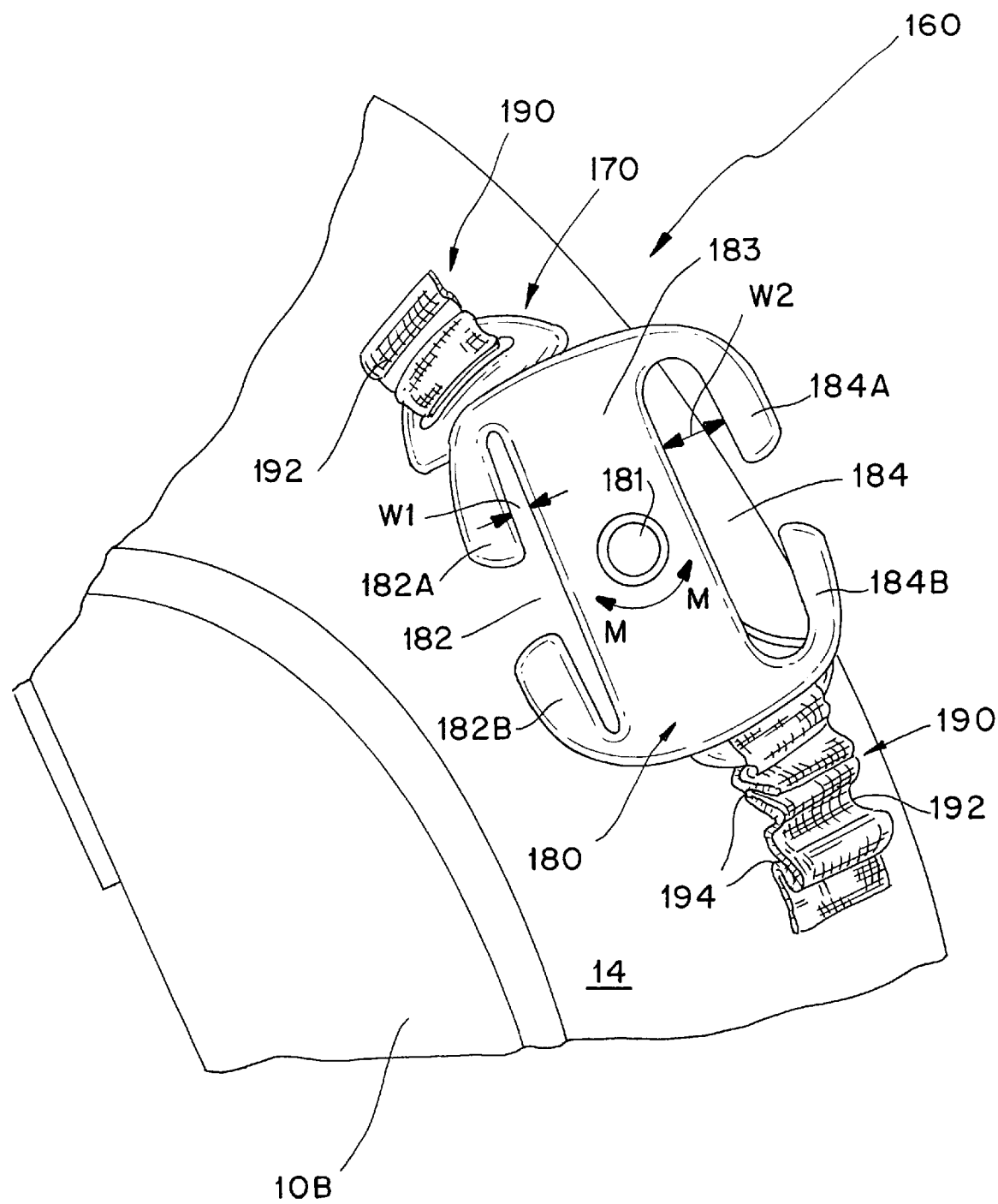
FIG. 14 is a side elevation view of a shoulder belt clip according to another aspect of the invention.

Installation of the child seat to a vehicle seat will now be described with reference to FIGS. 3 and 14. The child car seat 10 can be secured to the vehicle seat by threading a vehicle lap belt (not shown) though a belt channel 10C (FIG. 3) extending horizontally through the seat back 10B. The lap belt then can be latched to the appropriate belt buckle and tightened.

For larger children (e.g., 40–80 lbs.), the car seat 10 can be secured to the vehicle seat by threading a vehicle shoulder belt (not shown) through an appropriate shoulder belt clip 160. The clip 160 can be mounted to each side support 14 so that the child seat can be secured to the right- or left-hand side of the vehicle. The shoulder belt is threaded through the clip 160 located closest to the shoulder belt mount in the vehicle. The clip 160 allows the shoulder belt to be positioned close to the child's shoulder. In this way, the clip 160 adjusts the angle of inclination of the shoulder belt so that is does not contact the face and neck of the child.

In particular, a clip 160 according to the present invention is attached to the side support 14. The clip 160 includes a strap attachment portion 170 and a belt attachment portion 180 pivotally attached to the strap attachment portion 170. The strap attachment portion 170 is adjustably attached to the side support 14 with a strap attachment 190. The clip 160 can be positioned at different vertical locations along the side support 14 to further customize the car seat 10 to the size of the particular child occupant. The strap attachment 190 comprises a strap or the like 192 attached to, e.g., sewn, riveted, or otherwise affixed to, the side support 14. The strap 192 includes a series of loops 194 located at different vertical locations along the side support 14.

The strap attachment portion 170 includes first and second looped ends 172, 174, and a neck portion 176 connecting the looped ends 172, 174. The first and second looped ends 172, 174 can be detachably attached to appropriate loops 194 in the strap 192 to position the clip 160 at a given vertical location along the side support 14. For instance, the loop end 172, 174 can have a slot or the like to permit insertion of the loops 194.

The belt attachment portion 180 is pivotally attached to neck portion 176 of the strap attachment portion 170 with a pin or rivet 181, or the like. The belt attachment portion 180 can turn about the pin 181 in either a clockwise or a counterclockwise direction, as indicated by arrows M—M. The belt attachment portion 180 includes a first slot 182 and a second slot 184 through which the shoulder belt can be threaded. The second slot 184 is generally oriented toward the front of the child seat, and the first slot 182 is generally oriented toward the back of the child seat. The second slot 184 has a width W2 that is greater than the width W1 of the first slot 182. The shoulder strap can be passed through both slots 182 and 184 to lock the shoulder strap in place. Alternatively, greater width W2 allows a parent to place the shoulder strap through only the second slot 184 so that the shoulder strap can move freely. This arrangement is preferable for an older child who may desire greater freedom of movement. The pivot capability of the belt attachment portion 180 coupled with the wider second slot 184, allows the belt to slide more freely within the clip 160.

Respective first and second pairs of opposing fingers 182A, 182B and 184A, 184B, that respectively extend outwardly from a main portion 183 and curve toward each other, form the first and second slots 182, 184. The first and second pairs of opposing fingers 182A, 182B and 184A, 184B curve toward, yet remain spaced from each other, so that the shoulder belt can be inserted through the space formed between opposing fingers 182A, 182B and 184A, 184B into the respective slots 182, 184.

The child seat of the present invention can also be attached to the vehicle seat using a tether latch assembly, such as the ones disclosed in co-pending U.S. patent application Ser. No. 09/564,952, filed May 4, 2000 and entitled "Tether Latch For Securing A Child Vehicle Seat To An Anchorage." that secures to anchorages located in the crease between the seat cushion and seat back of the vehicle seat.

The child seat 10 can be made of thermoplastic or thermosetting plastic. As will be understood by those skilled in the art, the seat body can be constructed with voids or cavities in a thin, molded outer shell to decrease weight and reduce material cost without materially affecting the strength or durability of the seat body.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A child seat comprising:
   a seat body including a seat back and a seat portion connected to the seat back, the seat portion having a first base connected to the seat back and a second base connected to the first base, the first and second bases forming a seating surface upon which to sit, the first base being fixedly connected to the seat back and the second base being movably mounted relative to the first base for movement between a retracted position and an extended position to change the area of the seating surface; and
   a seat adjusting mechanism that moves the second base toward and away from the first base to lengthen and shorten the seating surface, the seat adjusting mechanism including:
   an anchor fixedly mounted to the first base;
   a shaft axially movably mounted to the anchor and anchored at one end to the second base; and
   an actuator extending from the anchored end, the shaft being movable relative to the anchor upon actuation of the actuator to move the second base relative to the first base.

2. A child seat according to claim 1, wherein the shaft has external threads and the anchor has complementary threads that engage the shaft external threads, the anchored end of the shaft being configured to allow the shaft to rotate but prevent relative axial displacement between the shaft and the second base.

3. A child seat according to claim 2, wherein the actuator is a rotatable knob that rotates the shaft.

4. A child seat comprising:
   a seat body including a seat back and a seat portion connected to the seat back, the seat portion having a first base connected to the seat back and a second base connected to the first base, the first and second bases forming a seating surface upon which to sit, the first and second base being movably connected relative to each other to change the area of the seating surface; and
   at least a first armrest mounted to one of a left-hand side and a right-hand side of the second base, the first armrest being movable with the second base.

5. A child seat according to claim 4, wherein the first armrest is mounted on the left-hand side of the second base, and further including a second armrest mounted on the right-hand side of the second base, wherein each of the first and second armrests is asymmetrically mounted to the second base about an axis and is rotatable between a first position and a second position, an arm resting portion of each armrest being higher in the first position than in the second position.

6. A child seat comprising:
   a seat body including a seat back and a seat portion connected to the seat back, the seat portion having a first base connected to the seat back and a second base connected to the first base, the first and second bases forming a seating surface upon which to sit, the first base being fixedly connected to the seat back and the second base being movably mounted relative to the first base for movement between a retracted position and an extended position to change the area of the seating surface; and
   opposing armrests mounted to the second base, the armrests being movable with the second base.

7. A child seat according to claim 6, wherein each of the armrests is asymmetrically mounted to the second base about an axis and is rotatable between a first position and a second position, an arm resting portion of each armrest being higher in the first position than in the second position.

8. A child seat according to claim 7, further including an actuator for each of the armrest for locking the respective armrest to the first or second position.

9. A child seat according to claim 8, wherein each of the armrests has a guide rail and the actuator is mounted to the second base and intersects the rotational axis of the armrest, the actuator engaging the respective guide rail to control rotation of the respective armrest.

10. A child seat according to claim 9, wherein the armrests each have a first supporting surface and a second supporting surface, and wherein, when the armrests are in the first position, the respective first supporting surfaces are higher than the respective second supporting surfaces and, when the armrests are in the second position, the respective second supporting surfaces are higher than the respective first supporting surfaces.

11. A child seat according to claim 10, further including a beverage container holder detachably mountable to one of the armrests, wherein at least one of the first supporting surface and the second supporting surface is configured to receive the beverage container holder.

12. A child seat according to claim 9, wherein the guide rail has a curved pathway, and the actuator has a key configured to slide relative to the curved pathway during rotation of the respective armrest.

13. A child seat according to claim 12, wherein the actuator is biased to position the key in the guide rail to prevent rotation of the respective armrest at first and second ends of the curved pathway.

14. A child seat according to claim 12, wherein the guide rail includes a first locking area adjacent to and contiguous with the first end of the curved pathway and a second locking area adjacent to and contiguous with the second end of the curved pathway.

15. A child seat according to claim 14, wherein the curved pathway is semi-circular, the first and second locking areas extending radially outwardly and diametrically opposite each other at the first and second ends of the curved pathway.

16. A child seat comprising:
   a seat body including a seat back and a seat portion connected to the seat back, the seat portion having a first base connected to the seat back and a second base connected to the first base, the first and second bases forming a seating surface upon which to sit, the first and second base being movably connected relative to each other to change the area of the seating surface; and a recline mechanism, connected to the first and second bases, for selectively tilting the seat body relative to a vehicle seat.

17. A child seat according to claim 16, wherein the recline mechanism is adapted to tilt the seat body regardless o[]the relative position between the first and second bases.

18. A child seat according to claim 16, wherein the recline mechanism comprises:

a recline assembly connected to the second base; and a first telescoping arm connected to the recline assembly and pivotally connected to the first base.

19. A child seat according to claim 18, further including a second telescoping arm connected to the recline assembly and pivotally connected to the first base.

20. A child seat according to claim 19, wherein the recline assembly comprises:

a pair of opposing towers mounted to the first base;

a recline rod releasably mounted to the towers; and a recline handle connected to the recline rod, wherein the towers each have vertically spaced slots adapted to receive the recline rod, the recline handle being movable to adjust the position of the recline rod relative to the towers.

21. A child seat according to claim 20, wherein each of the second telescoping arms connects to a respective one of the towers.

22. The child seat according to claim 16, further comprising a seat adjusting mechanism that moves the second base toward and away from the first base to lengthen and shorten the seating surface, the seat adjusting mechanism being located underneath the seating surface.

23. A child seat comprising:

a seat body including a seat back and a seat portion connected to the seat back, the seat portion having a first base connected to the seat back and a second base connected to the first base, the first and second bases forming a seating surface upon which to sit, the first and second base being movably connected relative to each other to change the area of the seating surface;

a headrest adjustably mounted to the seat back, wherein the seat back has a front surface and the headrest has a back surface, the headrest being adjustable between a first position at which at least a portion of the back surface of the headrest overlaps the front surface of the seat back and a second position at which the back surface of the headrest clears the front surface of the seat back; and a headrest adjustment mechanism including:

a support member mounted to the headrest and having an opening that exposes a backside of the seat back;

a bracket attached to the backside of the seat back, the bracket movably guiding the support member; and an adjustment latch movably mounted to the support member and having a projection aligned with and insertable in the opening to engage the backside of the seat back.

24. A child seat according to claim 23, wherein the backside of the seat back has a plurality of vertically spaced recesses adapted to hook the projection of the adjustment latch to lock the headrest relative to the seat back.

25. A child seat comprising:

a seat body including a seat back and a seat portion connected to the seat back, the seat portion having a first base connected to the seat back and a second base connected to the first base, the first and second bases forming a seating surface upon which to sit, the first and second base being movably connected relative to each other to change the area of the seating surface, wherein the seat back has side supports and a shoulder clip mounted to the side support, the shoulder clip including:

a mounting member secured to the side support; and a belt receiving portion rotatably mounted to the mounting member, the belt receiving portion having a first belt-receiving opening and a second belt-receiving opening, the first belt-receiving opening having a first width and the second belt-receiving opening having a second width greater than the first width.

26. A child seat according to claim 25, wherein the belt receiving portion includes a main portion and two pairs of fingers extending outwardly from the main portion and toward each other to define the first and second belt-receiving openings.

27. A shoulder clip comprising:

a mounting member adapted to be secured to a child seat; and a belt receiving portion rotatably mounted to the mounting member, the belt receiving portion having a first belt-receiving opening and a second belt-receiving opening, the first belt-receiving opening having a first width and the second belt-receiving opening having a second width greater than the first width.

28. A shoulder clip according to claim 27, wherein the belt receiving portion includes a main portion and two pairs of fingers extending outwardly from the main portion and toward each other to define the first and second belt-receiving openings.

\* \* \* \* \*